(12) United States Patent
Wang et al.

(10) Patent No.: US 12,075,454 B2
(45) Date of Patent: Aug. 27, 2024

(54) METHODS AND DEVICES FOR OPERATING WITH DUAL CONNECTIVITY

(71) Applicant: Telefonaktiebolaget LM Ericsson (publ), Stockholm (SE)

(72) Inventors: Min Wang, Luleå (SE); Jinhua Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 243 days.

(21) Appl. No.: 17/416,659

(22) PCT Filed: Sep. 27, 2019

(86) PCT No.: PCT/CN2019/108624
§ 371 (c)(1),
(2) Date: Jun. 21, 2021

(87) PCT Pub. No.: WO2020/134261
PCT Pub. Date: Jul. 2, 2020

(65) Prior Publication Data
US 2022/0053502 A1  Feb. 17, 2022

(30) Foreign Application Priority Data
Dec. 27, 2018 (WO) .............. PCT/CN2018/124453

(51) Int. Cl.
*H04W 72/542* (2023.01)
*H04L 5/00* (2006.01)
(Continued)

(52) U.S. Cl.
CPC ......... *H04W 72/542* (2023.01); *H04L 5/0032* (2013.01); *H04W 28/0236* (2013.01); *H04W 28/082* (2023.05)

(58) Field of Classification Search
CPC .......... H04W 72/542; H04W 28/0236; H04W 28/085; H04L 5/0032
(Continued)

(56) References Cited

U.S. PATENT DOCUMENTS

2015/0098322 A1* 4/2015 Chen ................ H04W 28/0864
370/230
2016/0295442 A1* 10/2016 Virtej .................. H04W 72/21
(Continued)

FOREIGN PATENT DOCUMENTS

| CN | 105850204 A | 8/2016 | |
|---|---|---|---|
| CN | 108282836 A | 7/2018 | |
| EP | 3648500 A1 * | 5/2020 | ........... H04B 17/318 |

OTHER PUBLICATIONS

International Search Report and Written Opinion of the International Searching Authority, PCT/CN2019/108624, dated Jan. 2, 2020, 9 pages.
(Continued)

*Primary Examiner* — Xuan Lu
(74) *Attorney, Agent, or Firm* — Christopher & Weisberg, P.A.

(57) ABSTRACT

The present disclosure provides a method in a terminal device having Dual Connectivity, DC, with a master network device and a secondary network device. The method includes: determining, for a split bearer, to split data to be transmitted to the master network device and the secondary network device based at least on a channel occupancy and/or Listen Before Talk, LBT, statistics associated with a connection to the secondary network device; and splitting the data for transmitting to the master network device and the secondary network device over the split bearer.

21 Claims, 13 Drawing Sheets

(51) Int. Cl.
*H04W 28/02* (2009.01)
*H04W 28/08* (2023.01)
*H04W 28/082* (2023.01)
*H04W 28/10* (2009.01)
*H04W 72/00* (2023.01)
*H04W 74/0808* (2024.01)
*H04W 76/15* (2018.01)

(58) Field of Classification Search
USPC ............................................. 370/230
See application file for complete search history.

(56) References Cited

U.S. PATENT DOCUMENTS

| | | | | |
|---|---|---|---|---|
| 2017/0374579 | A1* | 12/2017 | Wang | H04W 28/0278 |
| 2018/0092118 | A1* | 3/2018 | Kim | H04W 28/0278 |
| 2018/0199242 | A1 | 7/2018 | Deng | |
| 2018/0368204 | A1* | 12/2018 | Park | H04W 16/28 |
| 2019/0254100 | A1* | 8/2019 | Yu | H04W 76/19 |
| 2021/0029777 | A1* | 1/2021 | Lv | H04W 80/02 |
| 2021/0314786 | A1* | 10/2021 | Liu | H04W 16/32 |
| 2021/0392534 | A1* | 12/2021 | Kim | H04W 74/0833 |

OTHER PUBLICATIONS

"SCG Split Bearer Support in Option 3," 3GPP TSG-RAN WG3 NR AdHoc (R3-172235) Qingdao, China, Jun. 27-29, 2017, Agenda Item 10.8.1, Samsung, 3 pages.

EPO Communication with Supplementary European Search Report dated Feb. 15, 2023 for Patent Application No. 19901819.3, consisting of 16-pages.

3GPP TSG-RAN WG2 Meeting #84 R2-133855; Title: BSR and SR for dual connectivity; Agenda Item: 7.2.4; Source: NSN, Nokia Corporation; Document for: Discussion and Decision; Date and Location: Nov. 11-15, 2013, San Francisco, USA, consisting of 5-pages.

3GPP TSG-RAN WG2 Meeting #84 R2-133883; Title: BSR for small cell enhancement; Agenda Item: 7.2.4; Source: Huawei, HiSilicon; Document for: Discussion and Decision; Date and Location: Nov. 11-15, 2013, San Francisco, USA, consisting of 4-pages.

3GPP TSG-RAN2 Meeting #85 R2-140281; Title: BSR Transmission for Dual Connected UEs; Agenda Item: 7.2.3; Source: Intel Corporation; Document for: Discussion and decision; Date and Location: Feb. 10-14, 2014, Prague, Czech Republic, consisting of 3-pages.

3GPP TSG-RAN WG2 Meeting #85bis R2-141666; Title: Uplink data transmission details with split bearers; Agenda Item: 7.1.4; Source: Broadcom Corporation; Document for: Discussion and decision; Date and Location: Mar. 31-Apr. 4, 2014, consisting of 3-pages.

3GPP TSG-RAN WG2 #90 Tdoc R2-152330; Title: PDCP data transfer procedure for uplink bearer split; Agenda Item: 7.9; Source: Ericsson; Document for: Discussion, Decision, Date and Location: May 25-29, 2015, Fukuoka, Japan, consisting of 5-pages.

3GPP TSG-RAN WG2 #97bis Tdoc R2-1702749; Title: UL Split in Dual Connectivity; Agenda Item: 10.2.2.3; Source: Ericsson; Document for: Discussion, Decision; Date and Location: Apr. 3-7, 2017, Spokane, USA, consisting of 4-pages.

3GPP TSG-RAN WG2 #98 Tdoc R2-1704370; Title: PDCP data vol. reporting in duplication (BSR); Agenda Item: 10.3.3.3; Source: Ericsson; Document for: Discussion, Decision; Date and Location: May 15-19, 2017, Hangzhou, P.R. of China, consisting of 3-pages.

* cited by examiner

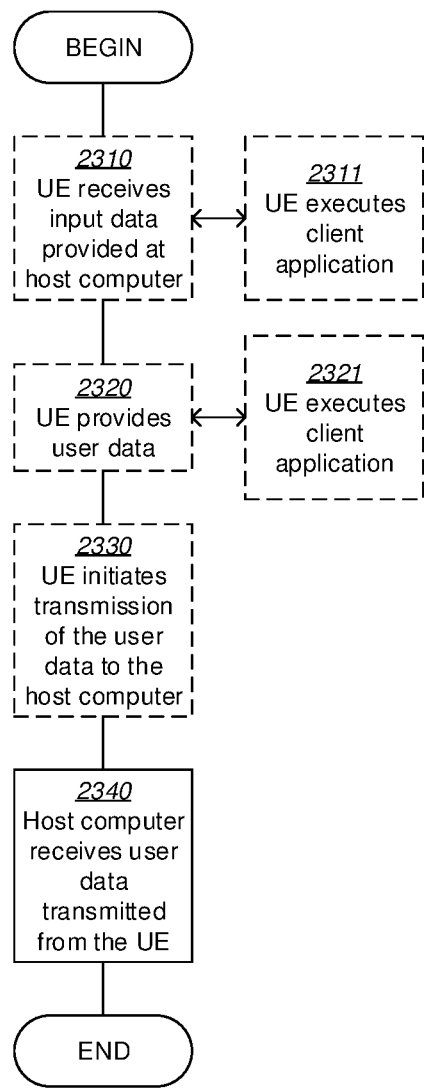
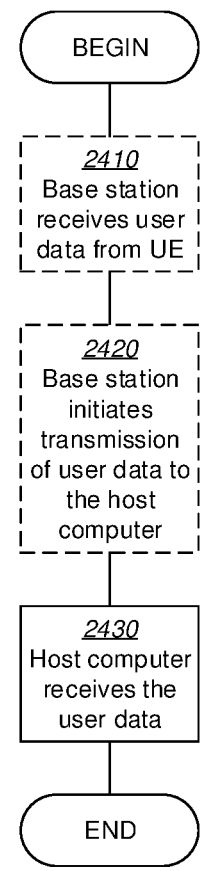
FIG. 23                             FIG. 24

METHODS AND DEVICES FOR OPERATING WITH DUAL CONNECTIVITY

CROSS REFERENCE TO RELATED APPLICATIONS

This application is a 35 U.S.C. § 371 national stage application of PCT International Application No. PCT/CN2019/108624 filed on Sep. 27, 2019, which in turns claims priority to PCT International Application No. PCT/CN2018/124453, filed on Dec. 27, 2018, the disclosures and content of which are incorporated by reference herein in their entirety.

TECHNICAL FIELD

The present disclosure relates to wireless communication, and more particularly, to methods and devices for operating with Dual Connectivity (DC).

BACKGROUND

Next generation systems are expected to support a wide range of use cases with varying requirements ranging from fully mobile devices to stationary Internet of Things (IoT) or fixed wireless broadband devices. In New Radio (NR), both License Assisted Access (LAA) and standalone unlicensed operations are to be supported in order to meet the increasing data demands. Unlike the LAA in Long Term Evolution (LTE), NR Unlicensed (NR-U) needs to support DC and standalone scenarios. In these cases, Medium Access Control (MAC) procedures including Random Access Channel (RACH) and scheduling procedures on unlicensed spectrum may be subjected to Listen Before Talk (LBT) failures.

In Release 12, a split bearer supports data splitting only in the downlink direction. In the uplink, a transmission path (i.e., either via Master evolved NodeB (MeNB) or Secondary evolved NodeB (SeNB)) of Packet Data Convergence Protocol (PDCP) Protocol Data Units (PDUs) is configured via Radio Resource Control (RRC). One of the objectives of the Release 13 work item on "DC enhancements for LTE" was introduction of the uplink split bearer feature. In the split bearer, data is split on the PDCP layer, which is transparent to higher layer protocols, and a Transport Control Protocol (TCP) or User Datagram Protocol (UDP) flow may benefit from utilizing both the MeNB and SeNB simultaneously to achieve an increased throughput.

In Release 13, a parameter ul-DataSplitThreshold was introduced for configuring an uplink split bearer. It is a byte-based parameter on PDCP level configured via RRC and may have a value of [0, 100, 200, 400, . . . , 819200]. If this parameter is configured, the amount of data stored in a PDCP buffer of a terminal device, also referred to as User Equipment or UE, is compared with this threshold to determine whether the data is to be transmitted from the PDCP layer to only one or both of the MeNB and SeNB. When the amount of data is smaller than the threshold, the data is only transmitted to a Master Cell Group (MCG) associated with the MeNB (when ul-DataSplitDRB-ViaSCG is set) or a Secondary Cell Group (SCG) associated with the SeNB (when ul-DataSplitDRB-ViaSCG is set). When the amount of data is larger than or equal to the threshold, the data is split and transmitted to both the MCG and SCG.

FIGS. 1A and 1B shows examples of split bearers. As shown, a UE 110 has dual connectivity with an MeNB 120 and an SeNB 130. The UE 110 has a PDCP buffer 112 and the ul-DataSplitThreshold is denoted by a dashed line. In FIG. 1A, the amount of data in the buffer 112 is larger than the threshold and thus the UE 110 splits the data for transmitting to the MeNB 120 and the SeNB 130. In FIG. 1B, the amount of data in the buffer 112 is smaller than the threshold and thus the UE 110 transmits the data to the MeNB 120 only (or alternatively the SeNB 130 only when ul-DataSplitDRB-ViaSCG is set).

In the case shown in FIG. 1A, the UE 110 indicates a total amount of data to be transmitted to the MeNB 120 and the SeNB 130 in a Buffer Status Report (BSR) to each of the MeNB 120 and the SeNB 130. For the case shown in FIG. 1B, the data is to be transmitted to only one eNB (e.g., the MeNB 120), and the UE 110 indicates the amount of data in a BSR only to the one eNB and indicates "0" to the other eNB.

Alternatively or additionally, the UE 110 may have a non-split bearer connected to the MeNB 120 or the SeNB 130. For the non-split bearer, the UE 110 indicates an amount of data to be transmitted to the connected eNB only (MeNB 120 or the SeNB 130).

The NR-U is expected to support DC scenarios in which an NR-U cell may serve as a Primary Secondary Cell (PSCell), including DC between a licensed band LTE Primary Cell (PCell) and an NR-U PSCell, DC between a licensed band NR PCell and an NR-U PSCell, or even an NR-U PCell and an NR-U PSCell. When a cell group (either MCG or SCG) includes one or more NR-U cells, control signaling and/or data to be transmitted to the cell group may be blocked due to LBT failures.

SUMMARY

It is an object of the present disclosure to provide methods and devices for operating with DC.

According to a first aspect of the present disclosure, a method in a terminal device having DC with a master network device and a secondary network device is provided. The method includes: determining, for a split bearer, to split data to be transmitted to the master network device and the secondary network device based at least on a channel occupancy and/or LBT statistics associated with a connection to the secondary network device; and splitting the data for transmitting to the master network device and the secondary network device over the split bearer.

In an embodiment, the operation of determining may include: determining to split the data when at least one of the following is satisfied: the channel occupancy being lower than a first occupancy threshold; the LBT statistics indicating an LBT failure ratio lower than a first failure ratio threshold; or the LBT statistics indicating a number of consecutive LBT failures smaller than a first number threshold.

In an embodiment, the operation of determining may further be based on a predetermined data amount threshold. The operation of determining may include: determining that an amount of the data, as stored in a buffer, is larger than or equal to the predetermined data amount threshold; and determining to split the data when at least one of the following is satisfied: the channel occupancy being lower than a first occupancy threshold; the LBT statistics indicating an LBT failure ratio lower than a first failure ratio threshold; or the LBT statistics indicating a number of consecutive LBT failures smaller than a first number threshold.

In an embodiment, the operation of determining may include: determining a data amount threshold based on the channel occupancy or the LBT statistics; and determining to split the data when an amount of the data, as stored in a buffer, is larger than or equal to the determined data amount threshold.

In an embodiment, the method may further include, subsequent to splitting the data for transmitting to the master network device and the secondary network device over the split bearer: suspending the splitting of the data when at least one of the following is satisfied: the channel occupancy becoming higher than a second occupancy threshold; the LBT statistics indicating an LBT failure ratio higher than a second failure ratio threshold; or the LBT statistics indicating a number of consecutive LBT failures larger than a second number threshold.

In an embodiment, the master network device may operate in a licensed or unlicensed band, and the secondary network device may operate in an unlicensed band.

According to a second aspect of the present disclosure, a method in a terminal device having DC with a master network device and a secondary network device is provided. The method includes: determining that a first cell, to which a non-split bearer is mapped, provided by the secondary network device has a first channel occupancy higher than an occupancy threshold, a first LBT failure ratio higher than a failure ratio threshold and/or a first number of consecutive LBT failures larger than a number threshold; and transmitting to the master network device a request to remap the non-split bearer to a second cell, having a second channel occupancy lower than the first channel occupancy, a second LBT failure ratio lower than the first LBT failure ratio and/or a second number of consecutive LBT failures smaller than the first number, provided by the secondary network device or to a third cell provided by the master network device.

According to a third aspect of the present disclosure, a method in a terminal device having DC with a master network device and a secondary network device is provided. The method includes: determining that a first cell, to which a connection of a split bearer is mapped, provided by the secondary network device, has a first channel occupancy higher than an occupancy threshold, a first LBT failure ratio higher than a failure ratio threshold and/or a first number of consecutive LBT failures larger than a number threshold; and transmitting to the master network device a request to reconfigure the split bearer to a non-split bearer or to remap the connection of the split bearer to a second cell, having a second channel occupancy lower than the first channel occupancy, a second LBT failure ratio lower than the first LBT failure ratio and/or a second number of consecutive LBT failures smaller than the first number, provided by the secondary network device.

According to a fourth aspect of the present disclosure, a method in a terminal device having DC with a master network device and a secondary network device is provided. The method includes: detecting a Buffer Status Report (BSR) triggering event associated with a Medium Access Control (MAC) entity connected to the master network device or a MAC entity connected to the secondary network device; and transmitting, by the MAC entity with which the BSR triggering event is associated, a BSR indicating buffer statuses for all Logic Channel Groups (LCGs) associated with both MAC entities.

According to a fifth aspect of the present disclosure, a method in a terminal device having DC with a master network device and a secondary network device is provided. The method includes: detecting a BSR triggering event associated with a MAC entity connected to the secondary network device; detecting an LBT failure condition associated with a connection to the secondary network device; and transmitting a BSR indicating a buffer status associated with the MAC entity to the master network device in response to the LBT failure condition.

In an embodiment, the master network device may operate in a licensed or unlicensed band, and the secondary network device may operate in an unlicensed band.

According to a sixth aspect of the present disclosure, a method in a terminal device having DC with a master network device and a secondary network device is provided. The method includes: detecting an LBT failure condition or a channel occupancy condition associated with a connection to the secondary network device; and transmitting uplink information associated with the secondary network device to the master network device in response to the LBT failure condition or the channel occupancy condition.

In an embodiment, the LBT failure condition may include a number of LBT failures being larger than a predetermined number threshold within a time period, and the channel occupancy condition may include a channel occupancy being higher than a predetermined occupancy threshold.

In an embodiment, the uplink information may be transmitted over uplink resources reserved in the master network device.

In an embodiment, the method may further include, prior to transmitting the uplink information: transmitting to the master network device a request for uplink resources; and receiving from the master network device a message indicating allocated uplink resources. The uplink information may be transmitted over the allocated uplink resources.

In an embodiment, the uplink information may include Uplink Control Information (UCI) or Physical Random Access Channel (PRACH) signaling.

In an embodiment, the master network device may operate in a licensed or unlicensed band, and the secondary network device may operate in an unlicensed band.

According to a seventh aspect of the present disclosure, a terminal device is provided. The terminal device includes a transceiver, a processor and a memory. The memory stores instructions executable by the processor whereby the terminal device is operative to perform the method according to any of the above first, second, third, fourth, fifth and sixth aspects.

According to an eighth aspect of the present disclosure, a computer readable storage medium is provided. The computer readable storage medium has computer program instructions stored thereon. The computer program instructions, when executed by a processor in a terminal device, cause the terminal device to perform the method according to any of the above first, second, third, fourth, fifth and sixth aspects.

According to a ninth aspect of the present disclosure, a method in a network device communicative with a terminal device having DC with the network device, as a master network device, and a secondary network device is provided. The method includes: receiving from the terminal device a request to remap a non-split bearer, mapped to a first cell provided by the secondary network device, to a second cell provided by the secondary network device or to a third cell provided by the master network device; and remapping the non-split bearer to the second cell or the third cell.

According to a tenth aspect of the present disclosure, a method in a network device communicative with a terminal device having DC with the network device, as a master network device, and a secondary network device is provided. The method includes: determining that a first cell, to which a non-split bearer is mapped, provided by the secondary network device has a first channel occupancy higher than an occupancy threshold, a first LBT failure ratio higher than a failure ratio threshold and/or a first number of consecutive LBT failures larger than a number threshold; and remapping the non-split bearer to a second cell, having a second channel occupancy lower than the first channel occupancy, a second LBT failure ratio lower than the first LBT failure ratio and/or a second number of consecutive LBT failures smaller than the first number, provided by the secondary network device, or to a third cell provided by the master network device.

According to an eleventh aspect of the present disclosure, a method in a network device communicative with a terminal device having DC with the network device, as a master network device, and a secondary network device is provided. The method includes: receiving from the terminal device a request to reconfigure a split bearer having a connection mapped to a first cell provided by the secondary network device, to a non-split bearer or to remap the connection of the split bearer to a second cell provided by the secondary network device; and reconfiguring the split bearer to the non-split bearer or remapping the connection of the split cell.

According to a twelfth aspect of the present disclosure, a method in a network device communicative with a terminal device having DC with the network device, as a master network device, and a secondary network device is provided. The method includes: determining that a first cell, to which a connection of a split bearer is mapped, provided by the secondary network device, has a first channel occupancy higher than an occupancy threshold, a first LBT failure ratio higher than a failure ratio threshold and/or a first number of consecutive LBT failures larger than a number threshold; and reconfiguring the split bearer to a non-split bearer or remapping the connection of the split bearer to a second cell, having a second channel occupancy lower than the first channel occupancy, a second LBT failure ratio lower than the first LBT failure ratio and/or a second number of consecutive LBT failures smaller than the first number, provided by the secondary network device.

According to a thirteenth aspect of the present disclosure, a method in a network device communicative with a terminal device having DC with the network device and another network device is provided. The method includes: receiving from the terminal device a BSR indicating a buffer status associated with a MAC entity connected to the other network device; and forwarding the BSR to the other network device.

In an embodiment, the network device may serve as a master network device and the other network device may serve as a secondary network device.

According to a fourteenth aspect of the present disclosure, a method in a network device communicative with a terminal device having DC with the network device, as a master network device, and a secondary network device is provided. The method includes: determining, for a split bearer, a configuration for splitting data of an aggregated buffer size between the master network device and the secondary network device based on respective radio channel qualities, channel occupancies and/or LBT statistics associated with respective connections from the terminal device to the master network device and the secondary network device; and signaling the configuration to the terminal device.

In an embodiment, the operation of determining may further be based on data queuing delays and/or loads associated with the respective connections.

In an embodiment, the master network device may operate in a licensed or unlicensed band, and the secondary network device may operate in an unlicensed band.

According to a fifteenth aspect of the present disclosure, a method in a network device communicative with a terminal device having DC with the network device, as a master network device, and a secondary network device is provided. The method includes: receiving from the terminal device uplink information associated with the secondary network device; and forwarding the uplink information to the secondary network device.

In an embodiment, the uplink information may be received over uplink resources reserved in the master network device.

In an embodiment, the method may further include, prior to receiving the uplink information: receiving from the terminal device a request for uplink resources; and transmitting to the terminal device a message indicating allocated uplink resources. The uplink information may be received over the allocated uplink resources.

In an embodiment, the uplink information may include Uplink Control Information (UCI) or Physical Random Access Channel (PRACH) signaling.

In an embodiment, the master network device may operate in a licensed or unlicensed band, and the secondary network device may operate in an unlicensed band.

According to a sixteenth aspect of the present disclosure, a network device is provided. The network device includes a transceiver, a processor and a memory. The memory stores instructions executable by the processor whereby the network device is operative to perform the method according to any of the ninth, tenth, eleventh, twelfth, thirteenth, fourteenth and fifteenth aspects.

According to a seventeenth aspect of the present disclosure, a computer readable storage medium is provided. The computer readable storage medium has computer program instructions stored thereon. The computer program instructions, when executed by a processor in a network device, cause the network device to perform the method according to any of the ninth, tenth, eleventh, twelfth, thirteenth, fourteenth and fifteenth aspects.

With the embodiments of the present disclosure, in a DC scenario, a channel occupancy or LB statistics associated with a connection in an unlicensed band are considered in split bearer configuration or data splitting configuration. In this way, a transmission delay of data and/or signaling messages due to high channel occupancy or LBT failures can be mitigated.

BRIEF DESCRIPTION OF THE DRAWINGS

The above and other objects, features and advantages will be more apparent from the following description of embodiments with reference to the figures, in which:

FIGS. 21 to 24 are flowcharts illustrating methods implemented in a communication system including a host computer, a base station and a user equipment.

DETAILED DESCRIPTION

Figure 1A:
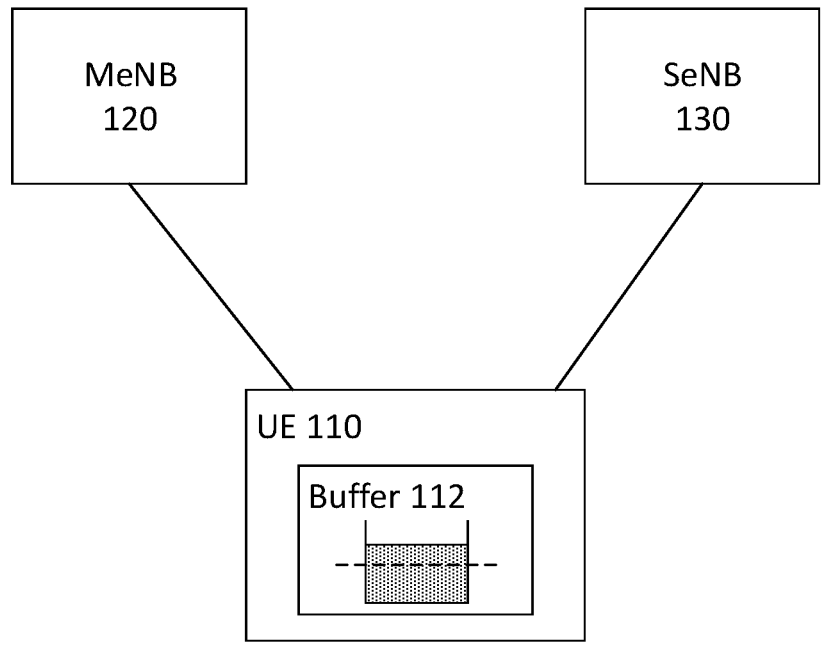
FIGS. 1A and 1B are schematic diagrams showing examples of split bearers.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or (next) generation NodeB (gNB), a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network.

Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/ or combinations thereof.

In the following description and claims, unless defined otherwise, all technical and scientific terms used herein have the same meaning as commonly understood by one of ordinary skills in the art to which this disclosure belongs.

Figure 2:
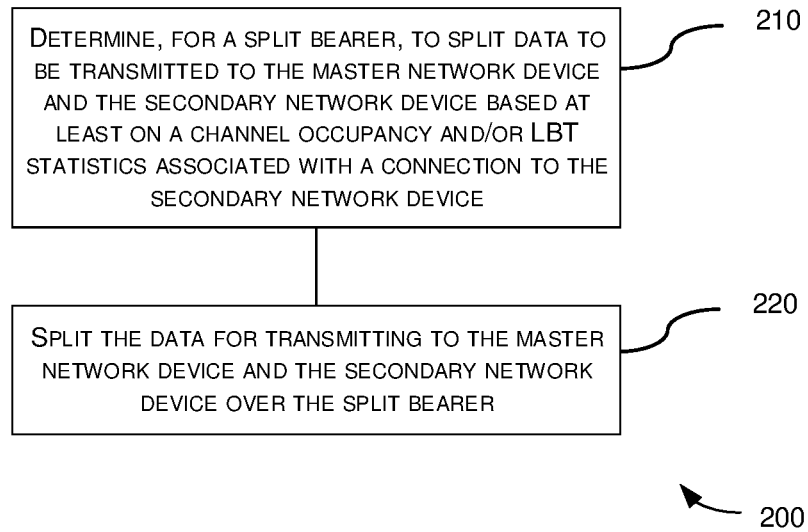
FIG. 2 is a flowchart illustrating a method for operating with DC according to an embodiment of the present disclosure.

FIG. 2 is a flowchart illustrating a method 200 for operating with DC according to an embodiment of the present disclosure. The method 200 can be performed in a terminal device having DC with a master network device and a secondary network device. The master network device may operate in a licensed band, and the secondary network device may operate in an unlicensed band.

At block 210, for a split bearer, it is determined to split data to be transmitted to the master network device and the secondary network device based at least on a channel occupancy or LBT statistics associated with a connection to the secondary network device. For example, in the context of the present disclosure, a channel occupancy can be defined as a percentage of time when a Received Signal Strength Indicator (RSSI) measured in a channel is higher than a preconfigured threshold. For example, the LBT statistics may indicate an LBT failure ratio or a number of consecutive LBT failures in the connection to the secondary network device. The LBT statistics may be provided by Radio Link Management (RLM).

For example, in the block 210, it may be determined to split the data when at least one of the following is satisfied: the channel occupancy being lower than a first occupancy threshold; the LBT statistics indicating an LBT failure ratio lower than a first failure ratio threshold; or the LBT statistics indicating a number of consecutive LBT failures smaller than a first number threshold (e.g., regardless of ul-DataSplitThreshold). In an example, it may be determined not to split the data (i.e., to transmit the data to the master network device only) when any of the above conditions is not met.

Figure 1B:
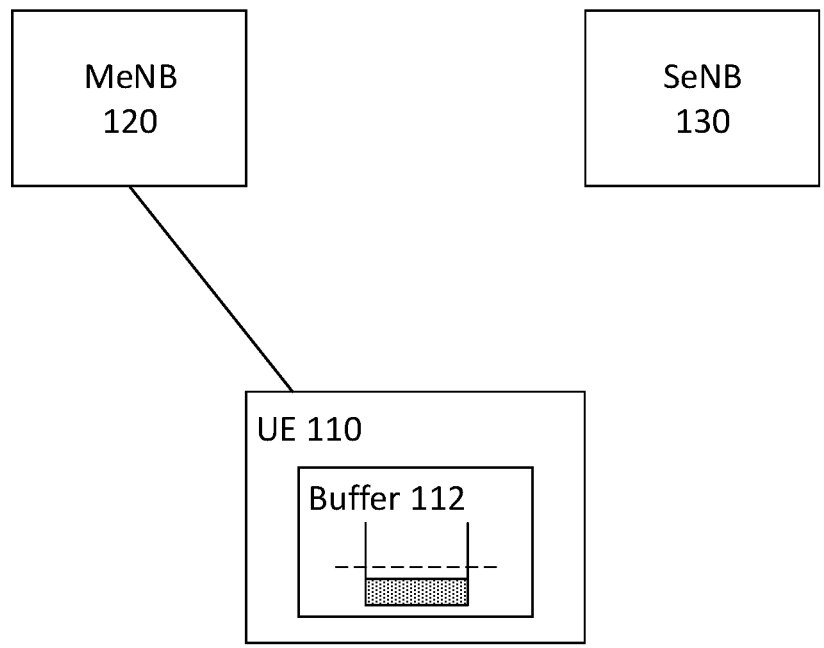

Alternatively, in the block 210, it can be determined first whether an amount of the data, as stored in a buffer (e.g., the PDCP buffer 112 in FIG. 1), is larger than or equal to a predetermined data amount threshold (e.g., ul-DataSplitThreshold as described above). In an example, it may be determined not to split the data (i.e., to transmit the data to the master network device only) when the amount of the data is smaller than the predetermined data amount threshold. On the other hand, when the amount of the data is larger than or equal to the predetermined data amount threshold, it may be determined to split the data when at least one of the following is satisfied: the channel occupancy being lower than a first occupancy threshold; the LBT statistics indicating an LBT failure ratio lower than a first failure ratio threshold; or the LBT statistics indicating a number of consecutive LBT failures smaller than a first number threshold. In an example, it may be determined not to split the data when any of the above conditions is not met. In an example, it may be determined not to split the data (i.e., to transmit the data to the master network device only) when any of the above conditions is not met.

Alternatively, in the block 210, a data amount threshold can be determined based on the channel occupancy and/or the LBT statistics and it may be determined to split the data when an amount of the data, as stored in a buffer (e.g., the PDCP buffer 112 in FIG. 1), is larger than or equal to the determined data amount threshold. For example, the parameter ul-DataSplitThreshold can be dynamically adjusted based on the channel occupancy or the LBT statistics, e.g., based on a mapping rule between values of ul-DataSplitThreshold and channel occupancies or LBT statistics. For example, a greater value of ul-DataSplitThreshold can be set in case of a higher channel occupancy, a higher LBT failure ratio and/or a larger number of consecutive LBT failures, or vice versa. In an example, it may be determined not to split the data (i.e., to transmit the data to the master network device only) when the amount of the data is smaller than the determined data amount threshold.

Alternatively, the master network device may operate in an unlicensed band. In the block 210, it may be determined whether to split data to be transmitted to the master network device and the secondary network device based at least on a channel occupancy and/or LBT statistics associated with a connection to the master network device.

At block 220, the data is split for transmitting to the master network device and the secondary network device over the split bearer.

In an example, subsequent to the block 220, the method 200 can further include: suspending (or disabling) the splitting of the data when at least one of the following is satisfied: the channel occupancy becoming higher than a second occupancy threshold; the LBT statistics indicating an LBT failure ratio higher than a second failure ratio threshold; or the LBT statistics indicating a number of consecutive LBT failures larger than a second number threshold. Further, if this continues for a predefined time period, the terminal device may request the master network device to reconfigure the split bearer to a non-split bearer (e.g., having a connection with the master network device only).

Similarly, for a downlink split bearer, a decision as to whether to split data for transmitting from a master network device and a secondary network device to a terminal device can be made depending on various parameters such as measurement reports received from the terminal device, traffic conditions, cell loads, bearer types, and/or radio channel quality indicators of connections. In this case, a channel occupancy or LBT statistics may be considered as well. For example, information or measurement results on the channel occupancy or LBT statistics can be exchanged between the master and secondary network devices via X2 or Xn interfaces.

Figure 3:
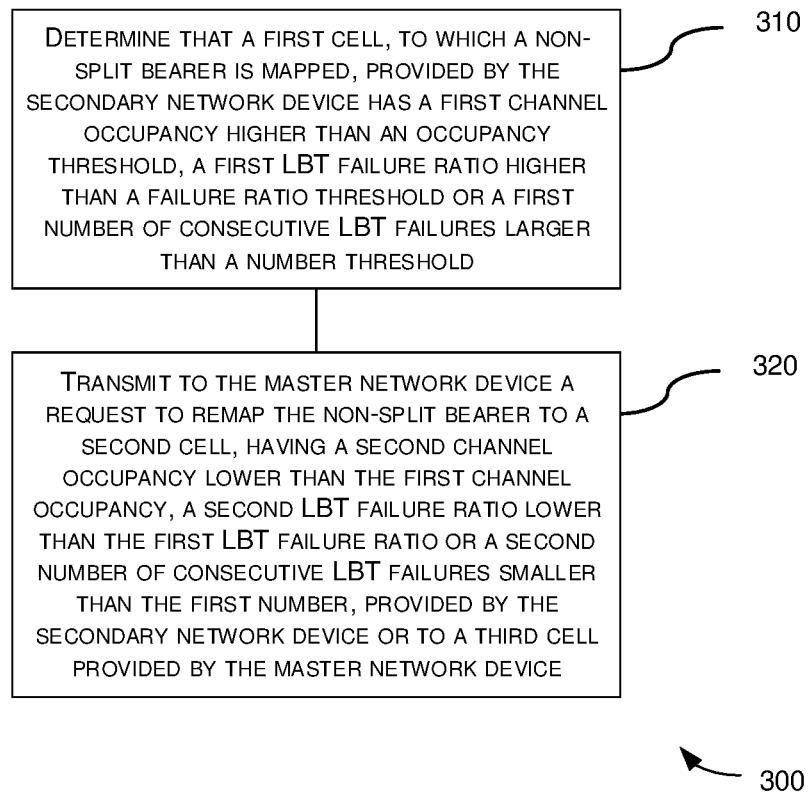
FIG. 3 is a flowchart illustrating a method for operating with DC according to another embodiment of the present disclosure.

FIG. 3 is a flowchart illustrating a method 300 for operating with DC according to an embodiment of the present disclosure. The method 300 can be performed in a terminal device having DC with a master network device and a secondary network device. The master network device may operate in a licensed band, and the secondary network device may operate in an unlicensed band.

At block 310, it is determined that a first cell, to which a non-split bearer is mapped, provided by the secondary network device has a first channel occupancy higher than an occupancy threshold, a first LBT failure ratio higher than a failure ratio threshold and/or a first number of consecutive LBT failures larger than a number threshold.

At block 320, a request is transmitted to the master network device, requesting the master network device to remap the non-split bearer to a second cell, having a second channel occupancy lower than the first channel occupancy, a second LBT failure ratio lower than the first LBT failure ratio and/or a second number of consecutive LBT failures smaller than the first number, provided by the secondary network device or to a third cell provided by the master network device. For example, the request can be transmitted via RRC signaling, MAC Control Element (CE), Physical Uplink Control Channel (PUCCH) based signaling or in-band signaling.

Alternatively, the master network device may operate in an unlicensed band. When the terminal device determines that a cell, to which a non-split bearer is mapped, provided by the master network device has a channel occupancy higher than an occupancy threshold, an LBT failure ratio higher than a failure ratio threshold and/or a number of consecutive LBT failures larger than a number threshold, it can transmit a request to the master network device or the secondary network device for remapping the non-split bearer to another cell, having a lower channel occupancy, a lower LBT failure ratio and/or a smaller number of consecutive LBT failures, provided by the master or secondary network device.

Figure 4:
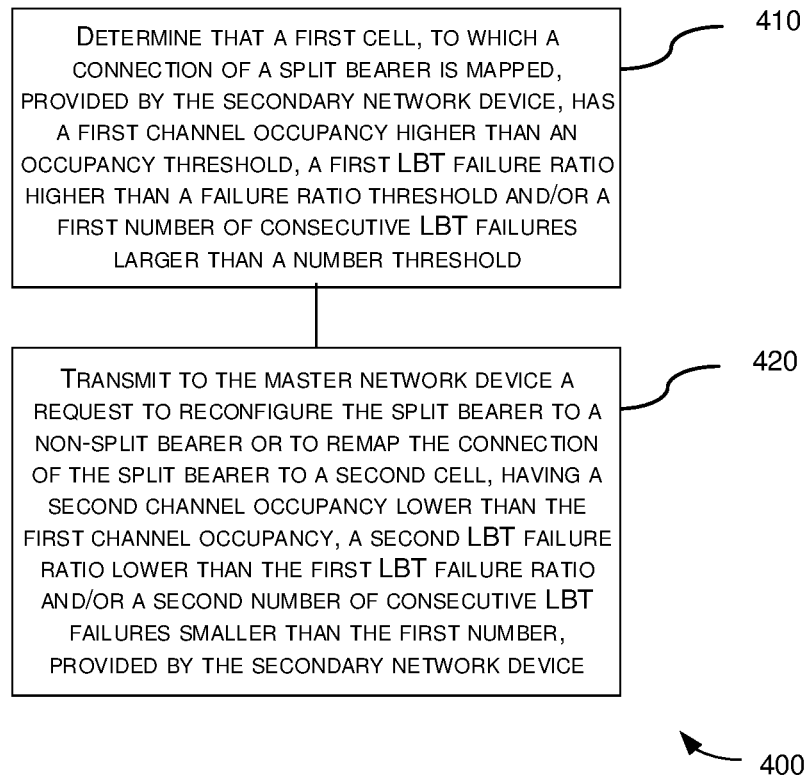
FIG. 4 is a flowchart illustrating a method for operating with DC according to another embodiment of the present disclosure.

FIG. 4 is a flowchart illustrating a method 400 for operating with DC according to an embodiment of the present disclosure. The method 400 can be performed in a terminal device having DC with a master network device and a secondary network device. The master network device may operate in a licensed band, and the secondary network device may operate in an unlicensed band.

At block 410, it is determined that a first cell, to which a connection of a split bearer is mapped, provided by the secondary network device, has a first channel occupancy higher than an occupancy threshold, a first LBT failure ratio higher than a failure ratio threshold and/or a first number of consecutive LBT failures larger than a number threshold.

At block 420, a request is transmitted to the master network device, requesting the master network device to reconfigure the split bearer to a non-split bearer or to remap the connection of the split bearer to a second cell, having a second channel occupancy lower than the first channel occupancy, a second LBT failure ratio lower than the first LBT failure ratio and/or a second number of consecutive LBT failures smaller than the first number, provided by the secondary network device.

Alternatively, the master network device may operate in an unlicensed band. When the terminal device determines that a cell, to which a connection of a split bearer is mapped, provided by the master network device has a channel occupancy higher than an occupancy threshold, an LBT failure ratio higher than a failure ratio threshold and/or a number of consecutive LBT failures larger than a number threshold, it can transmit a request to the master network device or the secondary network device for reconfiguring the split bearer to a non-split bearer or remapping the connection to another cell, having a lower channel occupancy, a lower LBT failure ratio and/or a smaller number of consecutive LBT failures, provided by the master network device.

Figure 5:
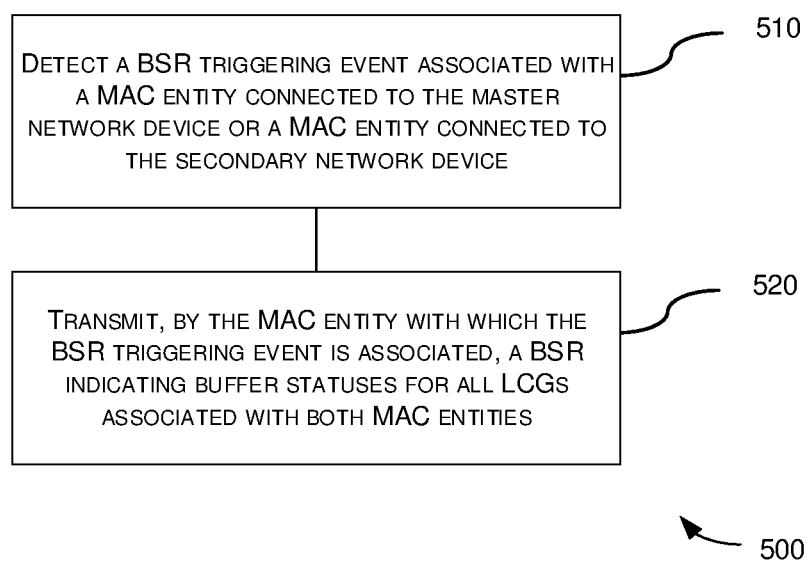
FIG. 5 is a flowchart illustrating a method for operating with DC according to another embodiment of the present disclosure.

FIG. 5 is a flowchart illustrating a method 500 for operating with DC according to an embodiment of the present disclosure. The method 500 can be performed in a terminal device having DC with a master network device and a secondary network device. The master network device may operate in a licensed or unlicensed band, and the secondary network device may operate in an unlicensed band.

At block 510, a Buffer Status Report (BSR) triggering event associated with a Medium Access Control (MAC) entity connected to the master network device or a MAC entity connected to the secondary network device is detected.

At block 520, a BSR indicating buffer statuses for all Logic Channel Groups (LCGs) associated with both MAC entities is transmitted by the MAC entity with which the BSR triggering event is associated, i.e., to the master network device or the secondary network device, whichever the MAC entity is connected to. For a non-split bearer, the LCGs associated with different MAC entities can be configured with different index spaces, such that the master network device and the secondary network device may need to exchange signaling information over an X2 or Xn interface. For a split bearer, the BSR may indicate a total amount of data to be transmitted to the master and secondary network devices. In this way, the reliability of scheduling messages between the terminal device and the master and/or secondary network devices can be improved. The scheduling latency due to LBT failures in unlicensed bands can also be reduced.

Figure 6:
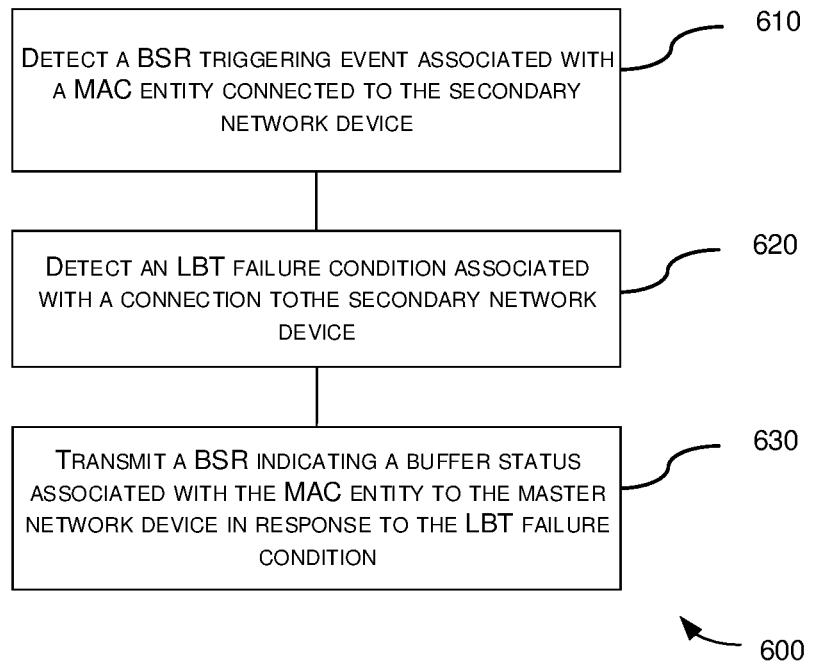
FIG. 6 is a flowchart illustrating a method for operating with DC according to another embodiment of the present disclosure.

FIG. 6 is a flowchart illustrating a method 600 for operating with DC according to an embodiment of the present disclosure. The method 600 can be performed in a terminal device having DC with a master network device and a secondary network device. The master network device may operate in a licensed band, and the secondary network device may operate in an unlicensed band.

At block 610, a BSR triggering event with a MAC entity connected to the secondary network device is detected.

At block 620, an LBT failure condition associated with a connection to the secondary network device is detected. In an example, the LBT failure condition may include a number of LBT failures being larger than a predetermined number threshold within a time period.

At block 630, a BSR indicating a buffer status associated with the MAC entity is transmitted to the master network device in response to the LBT failure condition.

Alternatively, the master network device may operate in an unlicensed band. When a BSR triggering event associated with a MAC entity connected to the master network device is detected and when an LBT failure condition associated with a connection to the master network device is detected, a BSR indicating a buffer status associated with the MAC entity is transmitted to the secondary network device in response to the LBT failure condition.

In this way, the scheduling latency due to LBT failures in unlicensed (e.g., NR-U) bands can be reduced. In an example, it can be configured by a network device (e.g., the master network device) whether to enable the feature of the method 600.

Figure 7:
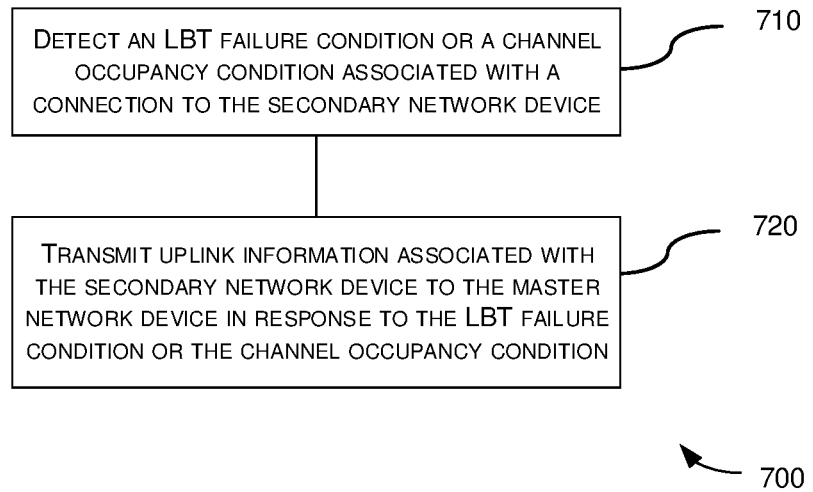
FIG. 7 is a flowchart illustrating a method for operating with DC according to another embodiment of the present disclosure.

FIG. 7 is a flowchart illustrating a method 700 for operating with DC according to an embodiment of the present disclosure. The method 700 can be performed in a terminal device having DC with a master network device and a secondary network device. The master network device may operate in a licensed band, and the secondary network device may operate in an unlicensed band.

At block 710, an LBT failure condition or a channel occupancy condition associated with a connection to the secondary network device is detected. In an example, the LBT failure condition may include a number of LBT failures being larger than a predetermined number threshold within a time period. The channel occupancy condition may include a channel occupancy being higher than a predetermined occupancy threshold.

At block 720, uplink information associated with the secondary network device is transmitted to the master network device in response to the LBT failure condition or the channel occupancy condition. In an example, the uplink information may include Uplink Control Information (UCI) or Physical Random Access Channel (PRACH) signaling.

In an example, the uplink information may be transmitted over uplink resources reserved in the master network device.

Alternatively, the method 700 can further include: transmitting to the master network device a request for uplink resources and receiving from the master network device a message indicating allocated uplink resources. The request can be transmitted via RRC signaling or MAC CE. Then, the uplink information can be transmitted over the allocated uplink resources.

Alternatively, the master network device may operate in an unlicensed band. When an LBT failure condition or a channel occupancy condition associated with a connection to the master network device is detected, uplink information associated with the master network device can be transmitted to the secondary network device over reserved or allocated uplink resources.

Figure 8:
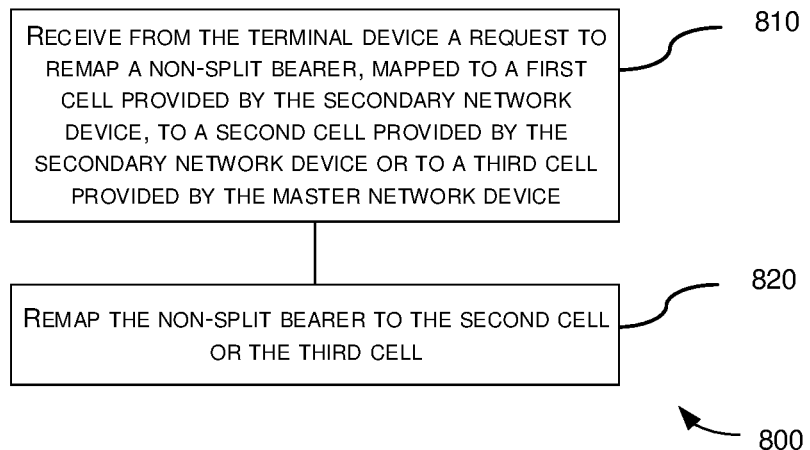
FIG. 8 is a flowchart illustrating a method for operating with DC according to another embodiment of the present disclosure.

FIG. 8 is a flowchart illustrating a method 800 for operating with DC according to an embodiment of the present disclosure. The method 800 can be performed in a network device communicative with a terminal device having DC with the network device, as a master network device, and a secondary network device. The master network device may operate in a licensed band, and the secondary network device may operate in an unlicensed band.

At block 810, a request is received from the terminal device, requesting the network device to remap a non-split bearer, mapped to a first cell provided by the secondary network device, to a second cell provided by the secondary network device or to a third cell provided by the master network device. The request may correspond to the request described above in connection with the block 320 of the method 300. The request can be received via RRC signaling, MAC CE, PUCCH based signaling or in-band signaling.

At block 820, the non-split bearer is remapped to the second cell or the third cell.

Alternatively, the master network device may operate in an unlicensed band. The master or secondary network device may receive from the terminal device a request to remap a non-split bearer, mapped to a cell provided by the master network device, to another cell provided by the master or secondary network device, and then remap the non-split bearer to the other cell.

Figure 9:
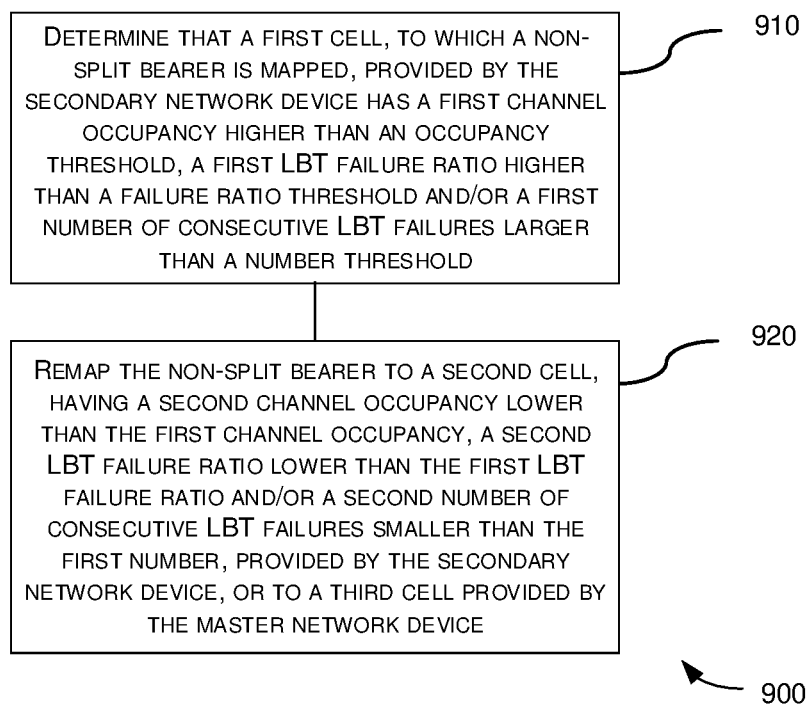
FIG. 9 is a flowchart illustrating a method for operating with DC according to another embodiment of the present disclosure.

FIG. 9 is a flowchart illustrating a method 900 for operating with DC according to an embodiment of the present disclosure. The method 900 can be performed in a network device communicative with a terminal device having DC with the network device, as a master network device, and a secondary network device. The master network device may operate in a licensed band, and the secondary network device may operate in an unlicensed band.

At block 910, it is determined that a first cell, to which a non-split bearer is mapped, provided by the secondary network device has a first channel occupancy higher than an occupancy threshold, a first LBT failure ratio higher than a failure ratio threshold and/or a first number of consecutive LBT failures larger than a number threshold.

At block 920, the non-split bearer is remapped to a second cell, having a second channel occupancy lower than the first channel occupancy, a second LBT failure ratio lower than the first LBT failure ratio and/or a second number of consecutive LBT failures smaller than the first number, provided by the secondary network device, or to a third cell provided by the master network device.

Alternatively, the master network device may operate in an unlicensed band. The master or secondary network device may determine that a cell, to which a non-split bearer is mapped, provided by the master network device has a channel occupancy higher than an occupancy threshold, an LBT failure ratio higher than a failure ratio threshold and/or a number of consecutive LBT failures larger than a number threshold, and then remap the non-split bearer to another cell having a lower channel occupancy, a lower LBT failure ratio and/or a smaller number of consecutive LBT failures, provided by the master or secondary network device.

Figure 10:
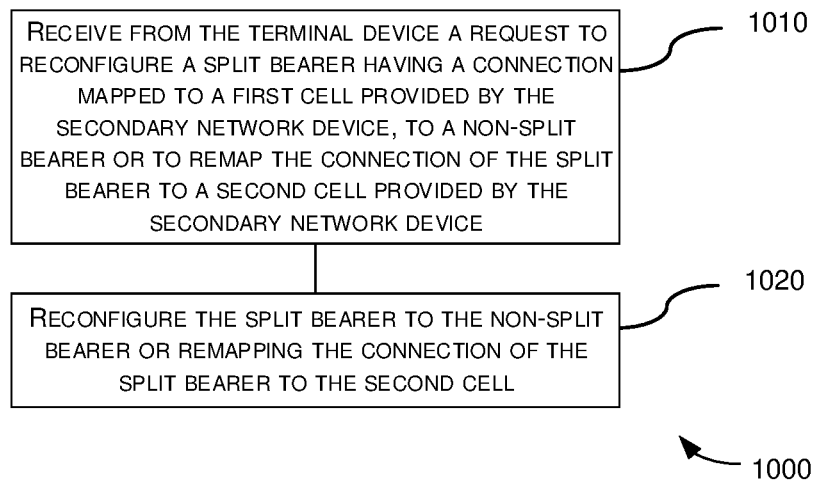
FIG. 10 is a flowchart illustrating a method for operating with DC according to another embodiment of the present disclosure.

FIG. 10 is a flowchart illustrating a method 1000 for operating with DC according to an embodiment of the present disclosure. The method 1000 can be performed in a network device communicative with a terminal device having DC with the network device, as a master network device, and a secondary network device. The master network device may operate in a licensed band, and the secondary network device may operate in an unlicensed band.

At block 1010, a request is received from the terminal device, requesting the network device to reconfigure a split bearer having a connection mapped to a first cell provided by the secondary network device, to a non-split bearer or to remap the connection of the split bearer to a second cell provided by the secondary network device. The request may correspond to the request described above in connection with the block 420 of the method 400.

At block 1020, the split bearer is reconfigured to the non-split bearer or the connection of the split bearer is remapped to the second cell.

Alternatively, the master network device may operate in an unlicensed band. The master or secondary network device may receive from the terminal device a request to reconfigure a split bearer having a connection mapped to a cell provided by the master network device, to a non-split bearer or to remap the connection of the split bearer to another cell provided by the master network device, and then reconfigure the split bearer to the non-split bearer or remap the connection of the split bearer to the other cell.

Figure 11:
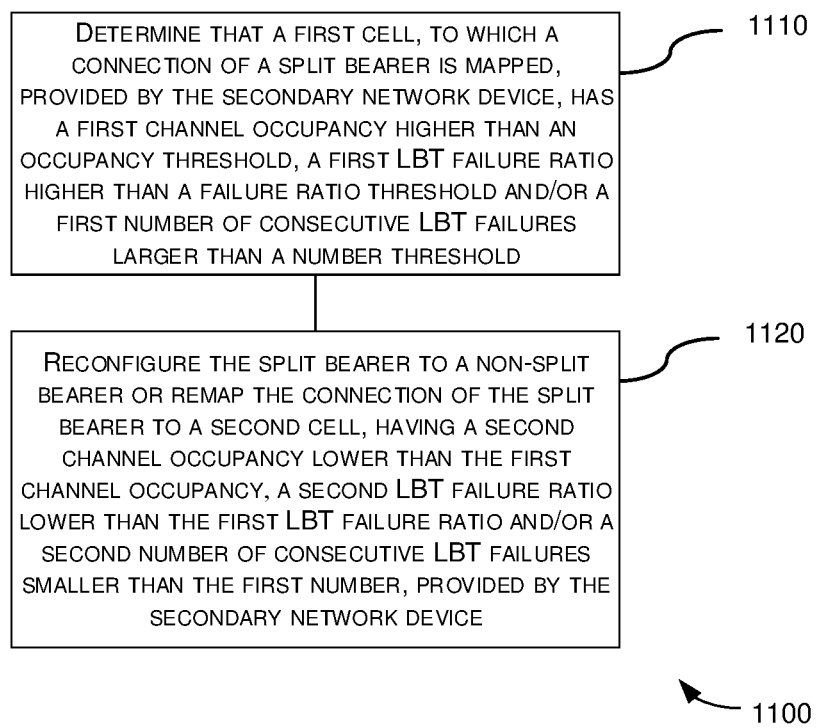
FIG. 11 is a flowchart illustrating a method for operating with DC according to another embodiment of the present disclosure.

FIG. 11 is a flowchart illustrating a method 1100 for operating with DC according to an embodiment of the present disclosure. The method 1100 can be performed in a network device communicative with a terminal device having DC with the network device, as a master network device, and a secondary network device. The master network device may operate in a licensed band, and the secondary network device may operate in an unlicensed band.

At block 1110, it is determined that a first cell, to which a connection of a split bearer is mapped, provided by the secondary network device, has a first channel occupancy higher than an occupancy threshold, a first LBT failure ratio higher than a failure ratio threshold and/or a first number of consecutive LBT failures larger than a number threshold.

At block 1120, the split bearer is reconfigured to a non-split bearer or the connection of the split bearer is remapped to a second cell, having a second channel occupancy lower than the first channel occupancy, a second LBT failure ratio lower than the first LBT failure ratio and/or a second number of consecutive LBT failures smaller than the first number, provided by the secondary network device.

Alternatively, the master network device may operate in an unlicensed band. The master or secondary network device may determine that a cell, to which a connection of a split bearer is mapped, provided by the master network device, has a channel occupancy higher than an occupancy threshold, an LBT failure ratio higher than a failure ratio threshold and/or a number of consecutive LBT failures larger than a number threshold, and then reconfigure the split bearer to the non-split bearer or remap the connection of the split bearer to another cell, having a lower channel occupancy, a lower LBT failure ratio and/or a smaller number of consecutive LBT failures, provided by the master network device.

In an example, the master or secondary network device may consider measurement results on channel occupancy or LBT statistics to decide how to map/remap a non-split radio bearer to either the master base station or the second base station.

Figure 12:
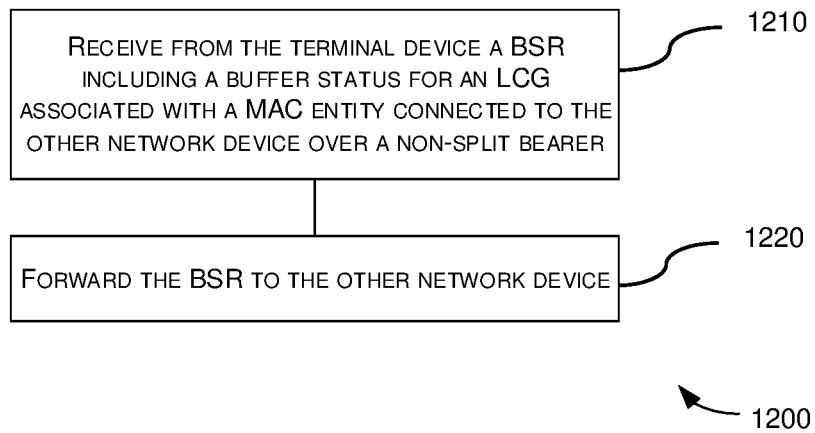
FIG. 12 is a flowchart illustrating a method for operating with DC according to another embodiment of the present disclosure.

FIG. 12 is a flowchart illustrating a method 1200 for operating with DC according to an embodiment of the present disclosure. The method 1200 can be performed in a network device communicative with a terminal device having DC with the network device and another network device.

At block 1210, a BSR is received from the terminal device. The BSR includes a buffer status for an LCG associated with a MAC entity connected to the other network device over a non-split bearer. The BSR may correspond to the BSR described above in connection with the block 520 of the method 500 or the BSR described above in connection with the block 630 of the method 600.

At block 1220, the BSR is forwarded to the other network device, e.g., via an X2 or Xn interface.

In an example, the network device may serve as a master network device and the other network device may serve as a secondary network device. Alternatively, the network device may serve as a secondary network device and the other network device may serve as a master network device. The master network device may operate in a licensed or unlicensed band, and the secondary network device may operate in an unlicensed band.

Figure 13:
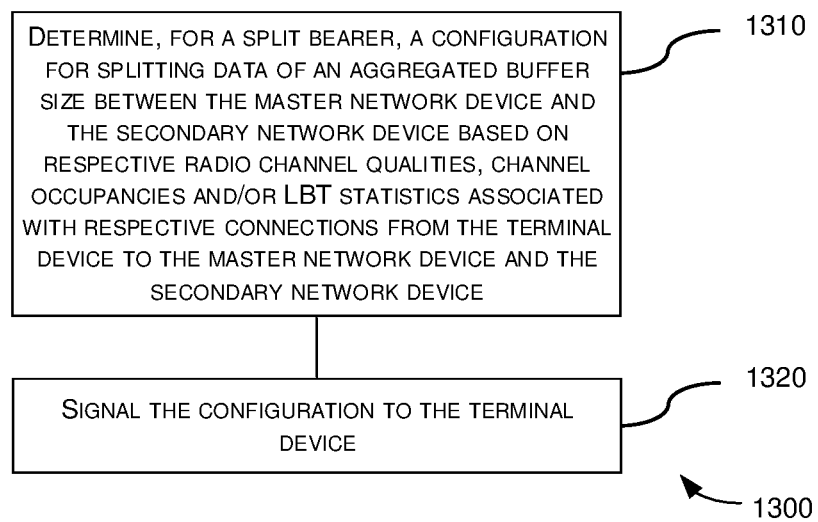
FIG. 13 is a flowchart illustrating a method for operating with DC according to another embodiment of the present disclosure.

FIG. 13 is a flowchart illustrating a method 1300 for operating with DC according to an embodiment of the present disclosure. The method 1300 can be performed in a network device communicative with a terminal device having DC with the network device, as a master network device, and a secondary network device. The master network device may operate in a licensed or unlicensed band, and the secondary network device may operate in an unlicensed band.

At block 1310, for a split bearer, a configuration for splitting data of an aggregated buffer size between the master network device and the secondary network device is determined based on respective radio channel qualities, channel occupancies and/or LBT statistics (e.g., the LBT statistics described above in connection with the method 200) associated with respective connections from the terminal device to the master network device and the secondary network device. In an example, the configuration is determined further based on data queuing delays and/or loads associated with the respective connections.

At block 1320, the configuration is signaled to the terminal device.

Figure 14:
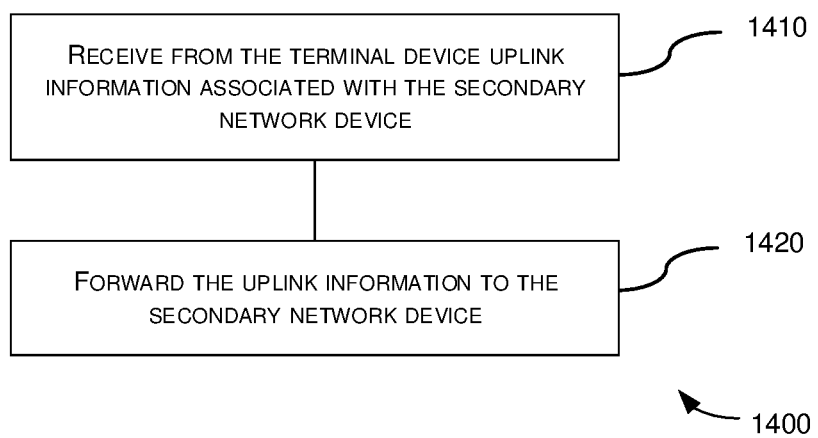
FIG. 14 is a flowchart illustrating a method for operating with DC according to another embodiment of the present disclosure.

FIG. 14 is a flowchart illustrating a method 1400 for operating with DC according to an embodiment of the present disclosure. The method 1400 can be performed in a network device communicative with a terminal device having DC with the network device, as a master network device, and a secondary network device. The master network device may operate in a licensed band, and the secondary network device may operate in an unlicensed band.

At block 1410, uplink information associated with the secondary network device is received from the terminal device. The uplink information may include UCI or PRACH signaling. The uplink information may correspond to the uplink information described above in connection with the block 720 of the method 700.

At block 1420, the uplink information is forwarded to the secondary network device, e.g., via an X2 or Xn interface.

In an example, the uplink information can be received over uplink resources reserved in the master network device. For example, a part of PUCCH resources can be reserved for receiving uplink information associated with the secondary network device when the DC is established/configured via e.g., RRC signaling. Therefore, this part of PUCCH resources may not be utilized by the master network device even if there is no PUCCH signaling for the secondary network device. This is a semi-static signaling option.

Alternatively, the method 1400 may further include: receiving from the terminal device a request for uplink resources and transmitting to the terminal device a message indicating allocated uplink resources. The request can be received via RRC signaling or MAC CE. Then, the uplink information can be received over the allocated uplink resources. In this case, no PUCCH resources are reserved.

The allocated uplink resources may be released if they have not been used for a given time period.

Alternatively, the master network device may operate in an unlicensed band. Similarly, the secondary network device can receive uplink information associated with the master network device from the terminal device and forward it to the master network device via the X2 or Xn interface.

On the other hand, when a high channel occupancy or LBT failures occur in a connection between the secondary network device and the terminal device, the master network device may receive downlink information, e.g., Downlink Control Information (DCI), associated with the secondary network device from the secondary network device and transmit it to the terminal device. Similarly, when a high channel occupancy or LBT failures occur in a connection between the master network device and the terminal device, the secondary network device may receive downlink information, e.g., DCI, associated with the master network device from the master network device and transmit it to the terminal device.

Figure 15:
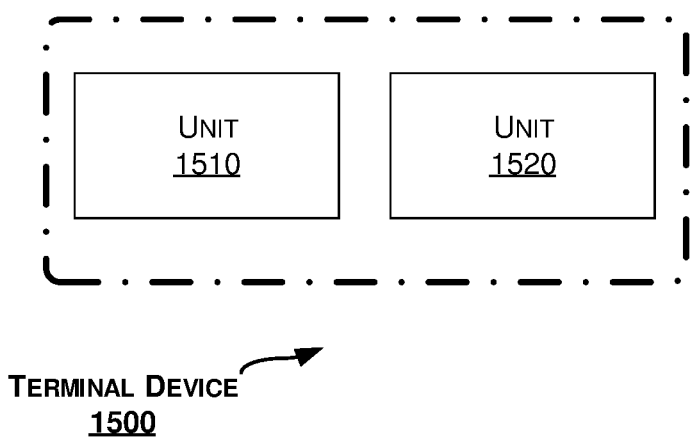
FIG. 15 is a block diagram of a terminal device according to an embodiment of the present disclosure.

Correspondingly to the method 200, 300, 400, 500, 600 or 700 as described above, a terminal device is provided. FIG. 15 is a block diagram of a terminal device 1500 according to an embodiment of the present disclosure. The terminal device 1500 has DC with a master network device and a secondary network device.

In an example, the terminal device 1500 includes a unit 1510 configured to determine, for a split bearer, to split data to be transmitted to the master network device and the secondary network device based at least on a channel occupancy and/or LBT statistics associated with a connection to the secondary network device. The terminal device 1500 further includes a unit 1520 configured to split the data for transmitting to the master network device and the secondary network device over the split bearer.

In an embodiment, the unit 1510 can be configured to determine to split the data when at least one of the following is satisfied: the channel occupancy being lower than a first occupancy threshold; the LBT statistics indicating an LBT failure ratio lower than a first failure ratio threshold; or the LBT statistics indicating a number of consecutive LBT failures smaller than a first number threshold.

In an embodiment, the operation of determining may further be based on a predetermined data amount threshold. The unit 1510 can be configured to: determine that an amount of the data, as stored in a buffer, is larger than or equal to the predetermined data amount threshold; and determine to split the data when at least one of the following is satisfied: the channel occupancy being lower than a first occupancy threshold; the LBT statistics indicating an LBT failure ratio lower than a first failure ratio threshold; or the LBT statistics indicating a number of consecutive LBT failures smaller than a first number threshold.

In an embodiment, the unit 1510 can be configured to: determine a data amount threshold based on the channel occupancy or the LBT statistics; and determine to split the data when an amount of the data, as stored in a buffer, is larger than or equal to the determined data amount threshold.

In an embodiment, the unit 1520 can further be configured to: suspend the splitting of the data when at least one of the following is satisfied: the channel occupancy becoming higher than a second occupancy threshold; the LBT statistics indicating an LBT failure ratio higher than a second failure ratio threshold; or the LBT statistics indicating a number of consecutive LBT failures larger than a second number threshold.

In an embodiment, the master network device may operate in a licensed or unlicensed band, and the secondary network device may operate in an unlicensed band.

Alternatively, the terminal device 1500 includes a unit 1510 configured to determine that a first cell, to which a non-split bearer is mapped, provided by the secondary network device has a first channel occupancy higher than an occupancy threshold, a first LBT failure ratio higher than a failure ratio threshold and/or a first number of consecutive LBT failures larger than a number threshold. The terminal device 1500 further includes a unit 1520 configured to transmit to the master network device a request to remap the non-split bearer to a second cell, having a second channel occupancy lower than the first channel occupancy, a second LBT failure ratio lower than the first LBT failure ratio and/or a second number of consecutive LBT failures smaller than the first number, provided by the secondary network device or to a third cell provided by the master network device.

Alternatively, the terminal device 1500 includes a unit 1510 configured to determine that a first cell, to which a connection of a split bearer is mapped, provided by the secondary network device, has a first channel occupancy higher than an occupancy threshold, a first LBT failure ratio higher than a failure ratio threshold and/or a first number of consecutive LBT failures larger than a number threshold. The terminal device 1500 further includes a unit 1520 configured to transmit to the master network device a request to reconfigure the split bearer to a non-split bearer or to remap the connection of the split bearer to a second cell, having a second channel occupancy lower than the first channel occupancy, a second LBT failure ratio lower than the first LBT failure ratio and/or a second number of consecutive LBT failures smaller than the first number, provided by the secondary network device.

Alternatively, the terminal device 1500 includes a unit 1510 configured to detect a Buffer Status Report (BSR) triggering event associated with a Medium Access Control (MAC) entity connected to the master network device or a MAC entity connected to the secondary network device. The terminal device 1500 further includes a unit 1520 configured to transmit, by the MAC entity with which the BSR triggering event is associated, a BSR indicating buffer statuses for all Logic Channel Groups (LCGs) associated with both MAC entities.

Alternatively, the terminal device 1500 includes a unit 1510 configured to detect a BSR triggering event associated with a MAC entity connected to the secondary network device and detect an LBT failure condition associated with a connection to the secondary network device. The terminal device 1500 further includes a unit 1520 configured to transmit a BSR indicating a buffer status associated with the MAC entity to the master network device in response to the LBT failure condition.

In an embodiment, the master network device may operate in a licensed or unlicensed band, and the secondary network device may operate in an unlicensed band.

Alternatively, the terminal device 1500 includes a unit 1510 configured to detect an LBT failure condition or a channel occupancy condition associated with a connection to the secondary network device. The terminal device 1500 further includes a unit 1520 configured to transmit uplink information associated with the secondary network device to the master network device in response to the LBT failure condition or the channel occupancy condition.

In an embodiment, the LBT failure condition may include a number of LBT failures being larger than a predetermined number threshold within a time period, and the channel occupancy condition may include a channel occupancy being higher than a predetermined occupancy threshold.

In an embodiment, the uplink information may be transmitted over uplink resources reserved in the master network device.

In an embodiment, the unit 1520 can further be configured to: transmit to the master network device a request for uplink resources; and receive from the master network device a message indicating allocated uplink resources. The uplink information may be transmitted over the allocated uplink resources.

In an embodiment, the uplink information may include Uplink Control Information (UCI) or Physical Random Access Channel (PRACH) signaling.

In an embodiment, the master network device may operate in a licensed or unlicensed band, and the secondary network device may operate in an unlicensed band.

The units 1510~1520 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 2, 3, 4, 5, 6 or 7.

Figure 16:
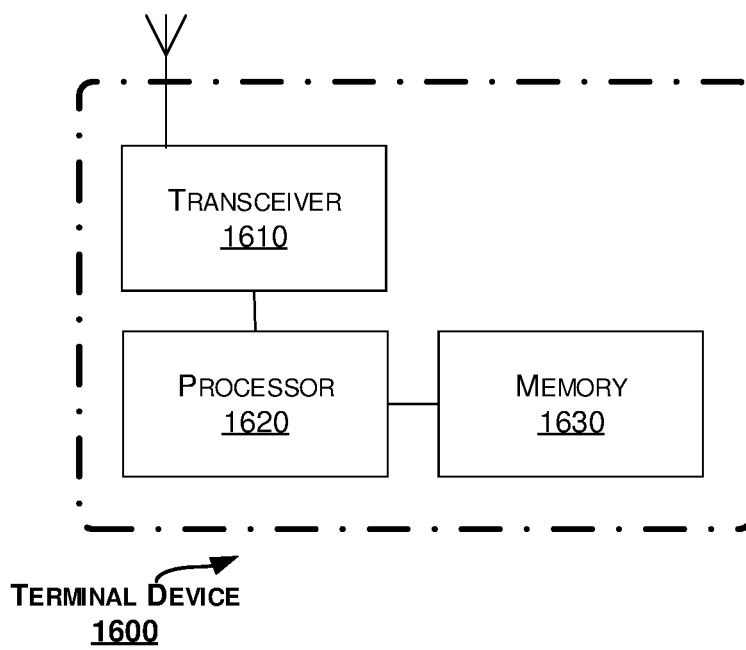
FIG. 16 is a block diagram of a terminal device according to another embodiment of the present disclosure.

FIG. 16 is a block diagram of a terminal device 1600 according to another embodiment of the present disclosure. The terminal device 1600 has DC with a master network device and a secondary network device. The terminal device 1600 includes a transceiver 1610, a processor 1620 and a memory 1630.

In an example, the memory 1630 contains instructions executable by the processor 1620 whereby the terminal device 1600 is operative to perform the actions, e.g., of the procedure described earlier in conjunction with FIG. 2. Particularly, the memory 1630 contains instructions executable by the processor 1620 whereby the terminal device 1600 is operative to: determine, for a split bearer, to split data to be transmitted to the master network device and the secondary network device based at least on a channel occupancy and/or LBT statistics associated with a connection to the secondary network device; and split the data for transmitting to the master network device and the secondary network device over the split bearer.

In an embodiment, the operation of determining may include: determining to split the data when at least one of the following is satisfied: the channel occupancy being lower than a first occupancy threshold; the LBT statistics indicating an LBT failure ratio lower than a first failure ratio threshold; or the LBT statistics indicating a number of consecutive LBT failures smaller than a first number threshold.

In an embodiment, the operation of determining may further be based on a predetermined data amount threshold. The operation of determining may include: determining that an amount of the data, as stored in a buffer, is larger than or equal to the predetermined data amount threshold; and determining to split the data when at least one of the following is satisfied: the channel occupancy being lower than a first occupancy threshold; the LBT statistics indicating an LBT failure ratio lower than a first failure ratio threshold; or the LBT statistics indicating a number of consecutive LBT failures smaller than a first number threshold.

In an embodiment, the operation of determining may include: determining a data amount threshold based on the channel occupancy or the LBT statistics; and determining to split the data when an amount of the data, as stored in a buffer, is larger than or equal to the determined data amount threshold.

In an embodiment, the memory 1630 can further contain instructions executable by the processor 1620 whereby the terminal device 1600 is operative to, subsequent to splitting the data for transmitting to the master network device and the secondary network device over the split bearer: suspend the splitting of the data when at least one of the following is satisfied: the channel occupancy becoming higher than a second occupancy threshold; the LBT statistics indicating an LBT failure ratio higher than a second failure ratio threshold; or the LBT statistics indicating a number of consecutive LBT failures larger than a second number threshold.

In an embodiment, the master network device may operate in a licensed or unlicensed band, and the secondary network device may operate in an unlicensed band.

In an example, the memory 1630 contains instructions executable by the processor 1620 whereby the terminal device 1600 is operative to perform the actions, e.g., of the procedure described earlier in conjunction with FIG. 3. Particularly, the memory 1630 contains instructions executable by the processor 1620 whereby the terminal device 1600 is operative to: determine that a first cell, to which a non-split bearer is mapped, provided by the secondary network device has a first channel occupancy higher than an occupancy threshold, a first LBT failure ratio higher than a failure ratio threshold and/or a first number of consecutive LBT failures larger than a number threshold; and transmit to the master network device a request to remap the non-split bearer to a second cell, having a second channel occupancy lower than the first channel occupancy, a second LBT failure ratio lower than the first LBT failure ratio and/or a second number of consecutive LBT failures smaller than the first number, provided by the secondary network device or to a third cell provided by the master network device.

In an example, the memory 1630 contains instructions executable by the processor 1620 whereby the terminal device 1600 is operative to perform the actions, e.g., of the procedure described earlier in conjunction with FIG. 4. Particularly, the memory 1630 contains instructions executable by the processor 1620 whereby the terminal device 1600 is operative to: determine that a first cell, to which a connection of a split bearer is mapped, provided by the secondary network device, has a first channel occupancy higher than an occupancy threshold, a first LBT failure ratio higher than a failure ratio threshold and/or a first number of consecutive LBT failures larger than a number threshold; and transmit to the master network device a request to reconfigure the split bearer to a non-split bearer or to remap the connection of the split bearer to a second cell, having a second channel occupancy lower than the first channel occupancy, a second LBT failure ratio lower than the first LBT failure ratio and/or a second number of consecutive LBT failures smaller than the first number, provided by the secondary network device.

In an example, the memory 1630 contains instructions executable by the processor 1620 whereby the terminal device 1600 is operative to perform the actions, e.g., of the procedure described earlier in conjunction with FIG. 5. Particularly, the memory 1630 contains instructions executable by the processor 1620 whereby the terminal device 1600 is operative to: detect a Buffer Status Report (BSR) triggering event associated with a Medium Access Control (MAC) entity connected to the master network device or a MAC entity connected to the secondary network device; and transmit, by the MAC entity with which the BSR triggering event is associated, a BSR indicating buffer statuses for all Logic Channel Groups (LCGs) associated with both MAC entities.

In an example, the memory 1630 contains instructions executable by the processor 1620 whereby the terminal device 1600 is operative to perform the actions, e.g., of the procedure described earlier in conjunction with FIG. 6. Particularly, the memory 1630 contains instructions executable by the processor 1620 whereby the terminal device 1600 is operative to: detect a BSR triggering event associated with a MAC entity connected to the secondary network device; detect an LBT failure condition associated with a connection to the secondary network device; and transmit a BSR indicating a buffer status associated with the MAC entity to the master network device in response to the LBT failure condition.

In an embodiment, the master network device may operate in a licensed or unlicensed band, and the secondary network device may operate in an unlicensed band.

In an example, the memory 1630 contains instructions executable by the processor 1620 whereby the terminal device 1600 is operative to perform the actions, e.g., of the procedure described earlier in conjunction with FIG. 7. Particularly, the memory 1630 contains instructions executable by the processor 1620 whereby the terminal device 1600 is operative to: detect an LBT failure condition or a channel occupancy condition associated with a connection to the secondary network device; and transmit uplink information associated with the secondary network device to the master network device in response to the LBT failure condition or the channel occupancy condition.

In an embodiment, the LBT failure condition may include a number of LBT failures being larger than a predetermined number threshold within a time period, and the channel occupancy condition may include a channel occupancy being higher than a predetermined occupancy threshold.

In an embodiment, the uplink information may be transmitted over uplink resources reserved in the master network device.

In an embodiment, the memory 1630 can further contain instructions executable by the processor 1620 whereby the terminal device 1600 is operative to, prior to transmitting the uplink information: transmit to the master network device a request for uplink resources; and receive from the master network device a message indicating allocated uplink resources. The uplink information may be transmitted over the allocated uplink resources.

In an embodiment, the uplink information may include Uplink Control Information (UCI) or Physical Random Access Channel (PRACH) signaling.

In an embodiment, the master network device may operate in a licensed or unlicensed band, and the secondary network device may operate in an unlicensed band.

Figure 17:
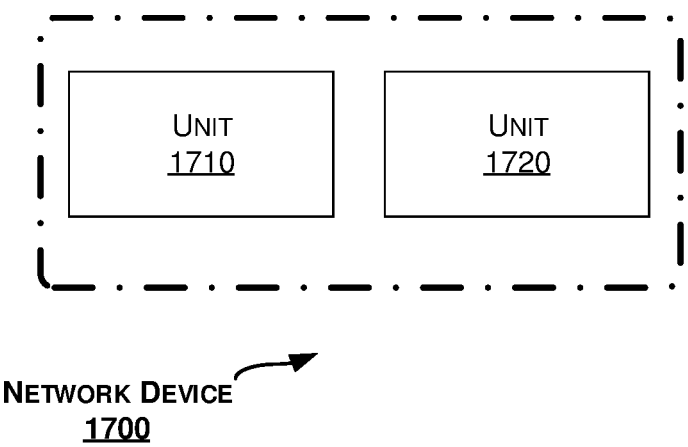
FIG. 17 is a block diagram of a network device according to an embodiment of the present disclosure.

Correspondingly to the method 800, 900, 1000, 1100, 1200, 1300 or 1400 as described above, a network device is provided. FIG. 17 is a block diagram of a network device 1700 according to an embodiment of the present disclosure.

In an example, the network device 1700 is communicative with a terminal device having DC with the network device, as a master network device, and a secondary network device. The network device 1700 includes a unit 1710 configured to receive from the terminal device a request to remap a non-split bearer, mapped to a first cell provided by the secondary network device, to a second cell provided by the secondary network device or to a third cell provided by the master network device. The network device 1700 further includes a unit 1720 configured to remap the non-split bearer to the second cell or the third cell.

Alternatively, the network device 1700 is communicative with a terminal device having DC with the network device, as a master network device, and a secondary network device. The network device 1700 includes a unit 1710 configured to determine that a first cell, to which a non-split bearer is mapped, provided by the secondary network device has a first channel occupancy higher than an occupancy threshold, a first LBT failure ratio higher than a failure ratio threshold and/or a first number of consecutive LBT failures larger than a number threshold. The network device 1700 further includes a unit 1720 configured to remap the non-split bearer to a second cell, having a second channel occupancy lower than the first channel occupancy, a second LBT failure ratio lower than the first LBT failure ratio and/or a second number of consecutive LBT failures smaller than the first number, provided by the secondary network device, or to a third cell provided by the master network device.

Alternatively, the network device 1700 is communicative with a terminal device having DC with the network device, as a master network device, and a secondary network device. The network device 1700 includes a unit 1710 configured to receive from the terminal device a request to reconfigure a split bearer having a connection mapped to a first cell provided by the secondary network device, to a non-split bearer or to remap the connection of the split bearer to a second cell provided by the secondary network device. The network device 1700 further includes a unit 1720 configured to reconfigure the split bearer to the non-split bearer or remap the connection of the split bearer to the second cell.

Alternatively, the network device 1700 is communicative with a terminal device having DC with the network device, as a master network device, and a secondary network device. The network device 1700 includes a unit 1710 configured to determine that a first cell, to which a connection of a split bearer is mapped, provided by the secondary network device, has a first channel occupancy higher than an occupancy threshold, a first LBT failure ratio higher than a failure ratio threshold and/or a first number of consecutive LBT failures larger than a number threshold. The network device 1700 further includes a unit 1720 configured to reconfigure the split bearer to a non-split bearer or remap the connection of the split bearer to a second cell, having a second channel occupancy lower than the first channel occupancy, a second LBT failure ratio lower than the first LBT failure ratio and/or a second number of consecutive LBT failures smaller than the first number, provided by the secondary network device.

Alternatively, the network device 1700 is communicative with a terminal device having DC with the network device and another network device. The network device 1700 includes a unit 1710 configured to receive from the terminal device a BSR indicating a buffer status associated with a MAC entity connected to the other network device. The network device 1700 further includes a unit 1720 configured to forward the BSR to the other network device.

In an embodiment, the network device may serve as a master network device and the other network device may serve as a secondary network device.

Alternatively, the network device 1700 is communicative with a terminal device having DC with the network device, as a master network device, and a secondary network device. The network device 1700 includes a unit 1710 configured to determine, for a split bearer, a configuration for splitting data of an aggregated buffer size between the master network device and the secondary network device based on respective radio channel qualities, channel occupancies and/or LBT statistics associated with respective connections from the terminal device to the master network device and the secondary network device. The network device 1700 further includes a unit 1720 configured to signal the configuration to the terminal device.

In an embodiment, the operation of determining may further be based on data queuing delays and/or loads associated with the respective connections.

In an embodiment, the master network device may operate in a licensed or unlicensed band, and the secondary network device may operate in an unlicensed band.

Alternatively, the network device 1700 is communicative with a terminal device having DC with the network device, as a master network device, and a secondary network device. The network device 1700 includes a unit 1710 configured to receive from the terminal device uplink information associated with the secondary network device. The network device 1700 further includes a unit 1720 configured to forward the uplink information to the secondary network device.

In an embodiment, the uplink information may be received over uplink resources reserved in the master network device.

In an embodiment, the unit 1710 can further be configured to: receive from the terminal device a request for uplink resources; and transmit to the terminal device a message indicating allocated uplink resources. The uplink information may be received over the allocated uplink resources.

In an embodiment, the uplink information may include Uplink Control Information (UCI) or Physical Random Access Channel (PRACH) signaling.

In an embodiment, the master network device may operate in a licensed or unlicensed band, and the secondary network device may operate in an unlicensed band.

The units 1710~1720 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 8, 9, 10, 11, 12, 13 or 14.

Figure 18:
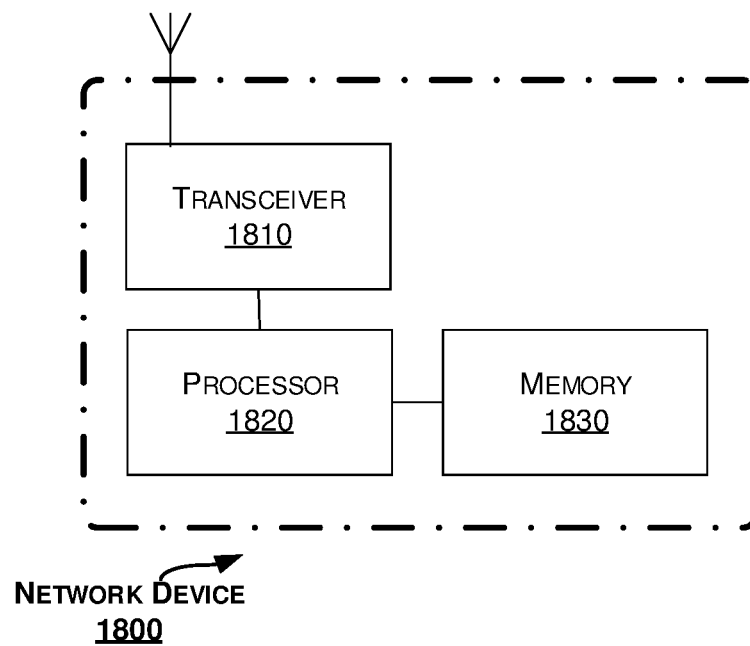
FIG. 18 is a block diagram of a network device according to another embodiment of the present disclosure.

FIG. 18 is a block diagram of a network device 1800 according to another embodiment of the present disclosure.

In an example, the network device 1800 is communicative with a terminal device having DC with the network device, as a master network device, and a secondary network device. The network device 1800 includes a transceiver 1810, a processor 1820 and a memory 1830. The memory 1830 contains instructions executable by the processor 1820 whereby the network device 1800 is operative to perform the actions, e.g., of the procedure described earlier in conjunction with FIG. 8. Particularly, the memory 1830 contains instructions executable by the processor 1820 whereby the network device 1800 is operative to: receive from the terminal device a request to remap a non-split bearer, mapped to a first cell provided by the secondary network device, to a second cell provided by the secondary network device or to a third cell provided by the master network device; and remap the non-split bearer to the second cell or the third cell.

Alternatively, the network device 1800 is communicative with a terminal device having DC with the network device, as a master network device, and a secondary network device. The network device 1800 includes a transceiver 1810, a processor 1820 and a memory 1830. The memory 1830 contains instructions executable by the processor 1820 whereby the network device 1800 is operative to perform the actions, e.g., of the procedure described earlier in conjunction with FIG. 9. Particularly, the memory 1830 contains instructions executable by the processor 1820 whereby network device 1800 is operative to: determine that a first cell, to which a non-split bearer is mapped, provided by the secondary network device has a first channel occupancy higher than an occupancy threshold, a first LBT failure ratio higher than a failure ratio threshold and/or a first number of consecutive LBT failures larger than a number threshold; and remap the non-split bearer to a second cell, having a second channel occupancy lower than the first channel occupancy, a second LBT failure ratio lower than the first LBT failure ratio and/or a second number of consecutive LBT failures smaller than the first number, provided by the secondary network device, or to a third cell provided by the master network device.

Alternatively, the network device 1800 is communicative with a terminal device having DC with the network device, as a master network device, and a secondary network device. The network device 1800 includes a transceiver 1810, a processor 1820 and a memory 1830. The memory 1830 contains instructions executable by the processor 1820 whereby the network device 1800 is operative to perform the actions, e.g., of the procedure described earlier in conjunction with FIG. 10. Particularly, the memory 1830 contains instructions executable by the processor 1820 whereby the network device 1800 is operative to: receive from the terminal device a request to reconfigure a split bearer having a connection mapped to a first cell provided by the secondary network device, to a non-split bearer or to remap the connection of the split bearer to a second cell provided by the secondary network device; and reconfigure the split bearer to the non-split bearer or remap the connection of the split bearer to the second cell.

Alternatively, the network device 1800 is communicative with a terminal device having DC with the network device, as a master network device, and a secondary network device. The network device 1800 includes a transceiver 1810, a processor 1820 and a memory 1830. The memory 1830 contains instructions executable by the processor 1820 whereby the network device 1800 is operative to perform the actions, e.g., of the procedure described earlier in conjunction with FIG. 11. Particularly, the memory 1830 contains instructions executable by the processor 1820 whereby the network device 1800 is operative to: determine that a first cell, to which a connection of a split bearer is mapped, provided by the secondary network device, has a first channel occupancy higher than an occupancy threshold, a first LBT failure ratio higher than a failure ratio threshold and/or a first number of consecutive LBT failures larger than a number threshold; and reconfigure the split bearer to a non-split bearer or remap the connection of the split bearer to a second cell, having a second channel occupancy lower than the first channel occupancy, a second LBT failure ratio lower than the first LBT failure ratio and/or a second number of consecutive LBT failures smaller than the first number, provided by the secondary network device.

Alternatively, the network device 1800 is communicative with a terminal device having DC with the network device and another network device. The network device 1800 includes a transceiver 1810, a processor 1820 and a memory 1830. The memory 1830 contains instructions executable by the processor 1820 whereby the network device 1800 is operative to perform the actions, e.g., of the procedure described earlier in conjunction with FIG. 12. Particularly, the memory 1830 contains instructions executable by the processor 1820 whereby the network device 1800 is operative to: receive from the terminal device a BSR indicating a buffer status associated with a MAC entity connected to the other network device; and forward the BSR to the other network device.

In an embodiment, the network device may serve as a master network device and the other network device may serve as a secondary network device.

Alternatively, the network device 1800 is communicative with a terminal device having DC with the network device, as a master network device, and a secondary network device. The network device 1800 includes a transceiver 1810, a processor 1820 and a memory 1830. The memory 1830 contains instructions executable by the processor 1820 whereby the network device 1800 is operative to perform the actions, e.g., of the procedure described earlier in conjunction with FIG. 13. Particularly, the memory 1830 contains instructions executable by the processor 1820 whereby the network device 1800 is operative to: determine, for a split bearer, a configuration for splitting data of an aggregated buffer size between the master network device and the secondary network device based on respective radio channel qualities, channel occupancies and/or LBT statistics associated with respective connections from the terminal device to the master network device and the secondary network device; and signal the configuration to the terminal device.

In an embodiment, the operation of determining may further be based on data queuing delays and/or loads associated with the respective connections.

In an embodiment, the master network device may operate in a licensed or unlicensed band, and the secondary network device may operate in an unlicensed band.

Alternatively, the network device 1800 is communicative with a terminal device having DC with the network device, as a master network device, and a secondary network device. The network device 1800 includes a transceiver 1810, a processor 1820 and a memory 1830. The memory 1830 contains instructions executable by the processor 1820 whereby the network device 1800 is operative to perform the actions, e.g., of the procedure described earlier in conjunction with FIG. 14. Particularly, the memory 1830 contains instructions executable by the processor 1820 whereby the network device 1800 is operative to: receive from the terminal device uplink information associated with the secondary network device; and forward the uplink information to the secondary network device.

In an embodiment, the uplink information may be received over uplink resources reserved in the master network device.

In an embodiment, the memory 1830 can further contain instructions executable by the processor 1820 whereby the network device 1800 is operative to, prior to receiving the uplink information: receive from the terminal device a request for uplink resources; and transmit to the terminal device a message indicating allocated uplink resources. The uplink information may be received over the allocated uplink resources.

In an embodiment, the uplink information may include Uplink Control Information (UCI) or Physical Random Access Channel (PRACH) signaling.

In an embodiment, the master network device may operate in a licensed or unlicensed band, and the secondary network device may operate in an unlicensed band.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1620 causes the terminal device 1600 to perform the actions, e.g., of the procedure described earlier in conjunction with FIG. 2, 3, 4, 5, 6 or 7; or code/computer readable instructions, which when executed by the processor 1820 causes the network device 1800 to perform the actions, e.g., of the procedure described earlier in conjunction with FIG. 8, 9, 10, 11, 12, 13 or 14.

The computer program product may be configured as a computer program code structured in computer program modules. The computer program modules could essentially perform the actions of the flow illustrated in FIG. 2, 3, 4, 5, 6, 7, 8, 9, 10, 11, 12, 13 or 14.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 19:
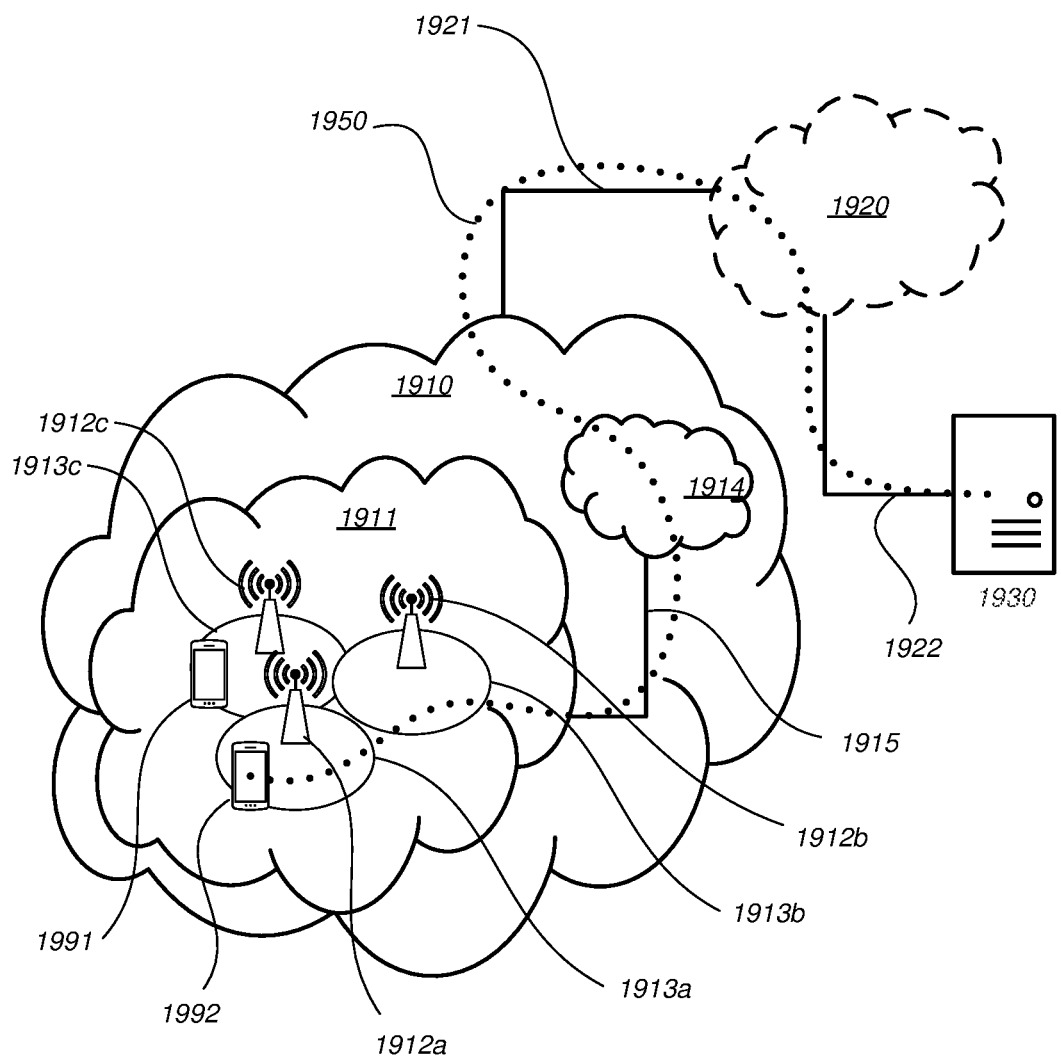
FIG. 19 schematically illustrates a telecommunication network connected via an intermediate network to a host computer.

With reference to FIG. 19, in accordance with an embodiment, a communication system includes a telecommunication network 1910, such as a 3GPP-type cellular network, which comprises an access network 1911, such as a radio access network, and a core network 1914. The access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to the core network 1914 over a wired or wireless connection 1915. A first user equipment (UE) 1991 located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

The telecommunication network 1910 is itself connected to a host computer 1930, which may be embodied in the hardware and/or software of a standalone server, a cloud-implemented server, a distributed server or as processing resources in a server farm. The host computer 1930 may be under the ownership or control of a service provider, or may be operated by the service provider or on behalf of the service provider. The connections 1921, 1922 between the telecommunication network 1910 and the host computer 1930 may extend directly from the core network 1914 to the host computer 1930 or may go via an optional intermediate network 1920. The intermediate network 1920 may be one of, or a combination of more than one of, a public, private or hosted network; the intermediate network 1920, if any, may be a backbone network or the Internet; in particular, the intermediate network 1920 may comprise two or more sub-networks (not shown).

The communication system of FIG. 19 as a whole enables connectivity between one of the connected UEs 1991, 1992 and the host computer 1930. The connectivity may be described as an over-the-top (OTT) connection 1950. The host computer 1930 and the connected UEs 1991, 1992 are configured to communicate data and/or signaling via the OTT connection 1950, using the access network 1911, the core network 1914, any intermediate network 1920 and possible further infrastructure (not shown) as intermediaries. The OTT connection 1950 may be transparent in the sense that the participating communication devices through which the OTT connection 1950 passes are unaware of routing of uplink and downlink communications. For example, a base station 1912 may not or need not be informed about the past routing of an incoming downlink communication with data originating from a host computer 1930 to be forwarded (e.g., handed over) to a connected UE 1991. Similarly, the base station 1912 need not be aware of the future routing of an outgoing uplink communication originating from the UE 1991 towards the host computer 1930.

Example implementations, in accordance with an embodiment, of the UE, base station and host computer discussed in the preceding paragraphs will now be described with reference to FIG. 20. In a communication system 2000, a host computer 2010 comprises hardware 2015 including a communication interface 2016 configured to set up and maintain a wired or wireless connection with an interface of a different communication device of the communication system 2000. The host computer 2010 further comprises processing circuitry 2018, which may have storage and/or processing capabilities. In particular, the processing circuitry 2018 may comprise one or more programmable processors, application-specific integrated circuits, field programmable gate arrays or combinations of these (not shown) adapted to execute instructions. The host computer 2010 further comprises software 2011, which is stored in or accessible by the host computer 2010 and executable by the processing circuitry 2018. The software 2011 includes a host application 2012. The host application 2012 may be operable to provide a service to a remote user, such as a UE 2030 connecting via an OTT connection 2050 terminating at the UE 2030 and the host computer 2010. In providing the service to the remote user, the host application 2012 may provide user data which is transmitted using the OTT connection 2050.

The communication system 2000 further includes a base station 2020 provided in a telecommunication system and comprising hardware 2025 enabling it to communicate with the host computer 2010 and with the UE 2030. The hardware 2025 may include a communication interface 2026 for setting up and maintaining a wired or wireless connection with an interface of a different communication device of the communication system 2000, as well as a radio interface 2027 for setting up and maintaining at least a wireless connection 2070 with a UE 2030 located in a coverage area (not shown in FIG. 20) served by the base station 2020. The communication interface 2026 may be configured to facilitate a connection 2060 to the host computer 2010. The connection 2060 may be direct or it may pass through a core network (not shown in FIG. 20) of the telecommunication system and/or through one or more intermediate networks outside the telecommunication system. In the embodiment shown, the hardware 2025 of the base station 2020 further includes processing circuitry 2028, which may comprise one or more programmable processors, application-specific integrated circuits, field programmable gate arrays or combinations of these (not shown) adapted to execute instructions. The base station 2020 further has software 2021 stored internally or accessible via an external connection.

The communication system 2000 further includes the UE 2030 already referred to. Its hardware 2035 may include a radio interface 2037 configured to set up and maintain a wireless connection 2070 with a base station serving a coverage area in which the UE 2030 is currently located. The hardware 2035 of the UE 2030 further includes processing circuitry 2038, which may comprise one or more programmable processors, application-specific integrated circuits, field programmable gate arrays or combinations of these (not shown) adapted to execute instructions. The UE 2030 further comprises software 2031, which is stored in or accessible by the UE 2030 and executable by the processing circuitry 2038. The software 2031 includes a client application 2032. The client application 2032 may be operable to provide a service to a human or non-human user via the UE 2030, with the support of the host computer 2010. In the host computer 2010, an executing host application 2012 may communicate with the executing client application 2032 via the OTT connection 2050 terminating at the UE 2030 and the host computer 2010. In providing the service to the user, the client application 2032 may receive request data from the host application 2012 and provide user data in response to the request data. The OTT connection 2050 may transfer both the request data and the user data. The client application 2032 may interact with the user to generate the user data that it provides.

Figure 20:
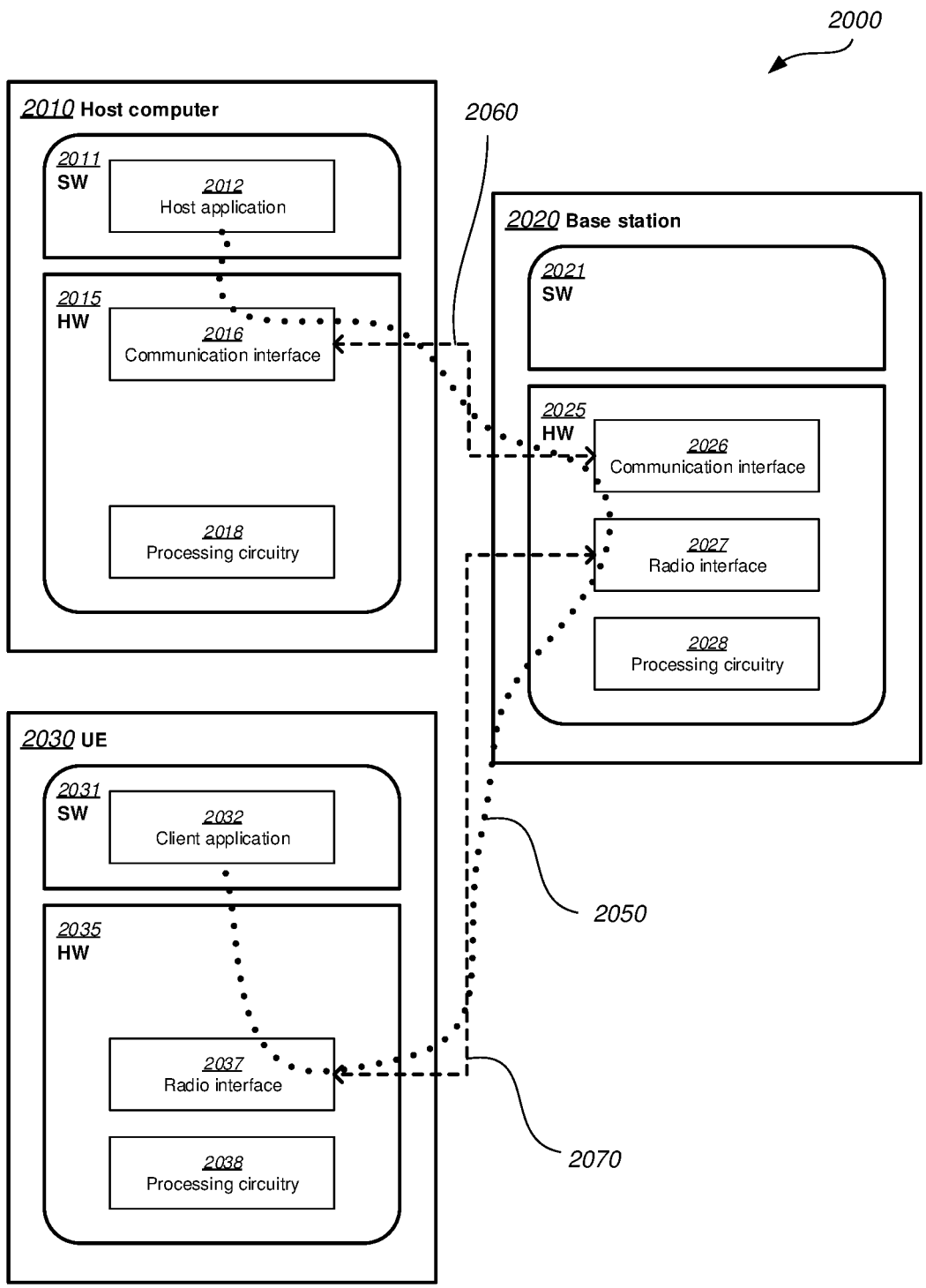
FIG. 20 is a generalized block diagram of a host computer communicating via a base station with a user equipment over a partially wireless connection.

It is noted that the host computer 2010, base station 2020 and UE 2030 illustrated in FIG. 20 may be identical to the host computer 1930, one of the base stations 1912a, 1912b, 1912c and one of the UEs 1991, 1992 of FIG. 19, respectively. This is to say, the inner workings of these entities may be as shown in FIG. 20 and independently, the surrounding network topology may be that of FIG. 19.

In FIG. 20, the OTT connection 2050 has been drawn abstractly to illustrate the communication between the host computer 2010 and the use equipment 2030 via the base station 2020, without explicit reference to any intermediary devices and the precise routing of messages via these devices. Network infrastructure may determine the routing, which it may be configured to hide from the UE 2030 or from the service provider operating the host computer 2010, or both. While the OTT connection 2050 is active, the network infrastructure may further take decisions by which it dynamically changes the routing (e.g., on the basis of load balancing consideration or reconfiguration of the network).

The wireless connection 2070 between the UE 2030 and the base station 2020 is in accordance with the teachings of the embodiments described throughout this disclosure. One or more of the various embodiments improve the performance of OTT services provided to the UE 2030 using the OTT connection 2050, in which the wireless connection 2070 forms the last segment. More precisely, the teachings of these embodiments may improve scheduling latency and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 2050 between the host computer 2010 and UE 2030, in response to variations in the measurement results. The measurement procedure and/or the network functionality for reconfiguring the OTT connection 2050 may be implemented in the software 2011 of the host computer 2010 or in the software 2031 of the UE 2030, or both. In embodiments, sensors (not shown) may be deployed in or in association with communication devices through which the OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of the OTT connection 2050 may include message format, retransmission settings, preferred routing etc.; the reconfiguring need not affect the base station 2020, and it may be unknown or imperceptible to the base station 2020. Such procedures and functionalities may be known and practiced in the art. In certain embodiments, measurements may involve proprietary UE signaling facilitating the host computer's 2010 measurements of throughput, propagation times, latency and the like. The measurements may be implemented in that the software 2011, 2031 causes messages to be transmitted, in particular empty or 'dummy' messages, using the OTT connection 2050 while it monitors propagation times, errors etc.

Figure 21:
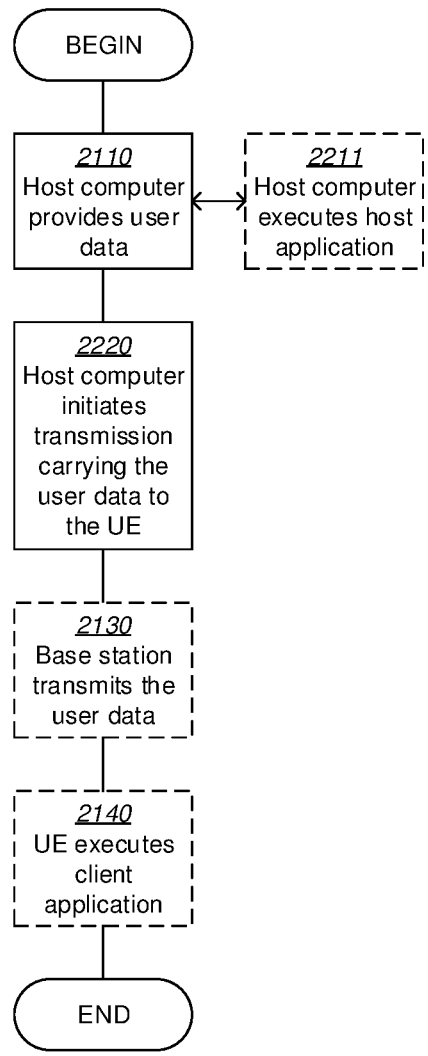

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In a first step 2110 of the method, the host computer provides user data. In an optional substep 2111 of the first step 2110, the host computer provides the user data by executing a host application. In a second step 2120, the host computer initiates a transmission carrying the user data to the UE. In an optional third step 2130, the base station transmits to the UE the user data which was carried in the transmission that the host computer initiated, in accordance with the teachings of the embodiments described throughout this disclosure. In an optional fourth step 2140, the UE executes a client application associated with the host application executed by the host computer.

Figure 22:
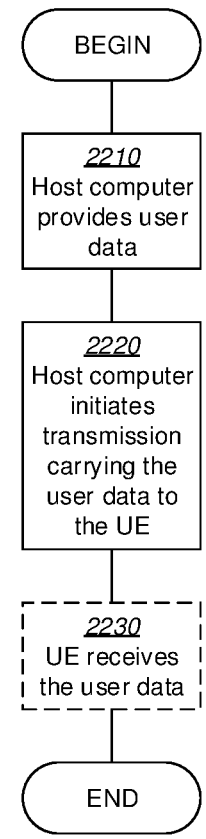

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In a first step 2210 of the method, the host computer provides user data. In an optional substep (not shown) the host computer provides the user data by executing a host application.

In a second step 2220, the host computer initiates a transmission carrying the user data to the UE. The transmission may pass via the base station, in accordance with the teachings of the embodiments described throughout this disclosure. In an optional third step 2230, the UE receives the user data carried in the transmission.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In an optional first step 2310 of the method, the UE receives input data provided by the host computer. Additionally or alternatively, in an optional second step 2320, the UE provides user data. In an optional substep 2321 of the second step 2320, the UE provides the user data by executing a client application. In a further optional substep 2311 of the first step 2310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 2330, transmission of the user data to the host computer. In a fourth step 2340 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In an optional first step 2410 of the method, in accordance with the teachings of the embodiments described throughout this disclosure, the base station receives user data from the UE. In an optional second step 2420, the base station initiates transmission of the received user data to the host computer. In a third step 2430, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a terminal device having Dual Connectivity, DC, with a master network device and a secondary network device, the method comprising:
   determining, for a split bearer, to split data to be transmitted to the master network device and the secondary network device based at least on Listen Before Talk, LBT, statistics associated with a connection to the secondary network device, the determining comprising:
      determining a data amount threshold based on the LBT statistics; and
      determining to split the data when an amount of the data, as stored in a buffer, is larger than or equal to the determined data amount threshold; and
   splitting the data for transmitting to the master network device and the secondary network device over the split bearer.

2. The method of claim 1, wherein said determining comprises:
   determining to split the data when at least one of the following is satisfied:
   the channel occupancy being lower than a first occupancy threshold;
   the LBT statistics indicating an LBT failure ratio lower than a first failure ratio threshold; or
   the LBT statistics indicating a number of consecutive LBT failures smaller than a first number threshold.

3. The method of claim 1, wherein said determining is further based on a predetermined data amount threshold and said determining comprises:

determining that an amount of the data, as stored in a buffer, is larger than or equal to the predetermined data amount threshold; and
determining to split the data when at least one of the following is satisfied:
the channel occupancy being lower than a first occupancy threshold;
the LBT statistics indicating an LBT failure ratio lower than a first failure ratio threshold; or
the LBT statistics indicating a number of consecutive LBT failures smaller than a first number threshold.

4. The method of claim 1, further comprising,
subsequent to splitting the data for transmitting to the master network device and the secondary network device over the split bearer:
suspending the splitting of the data when at least one of the following is satisfied:
the channel occupancy becoming higher than a second occupancy threshold;
the LBT statistics indicating an LBT failure ratio higher than a second failure ratio threshold; or
the LBT statistics indicating a number of consecutive LBT failures larger than a second number threshold.

5. The method of claim 1, wherein the master network device operates in a licensed or unlicensed band, and the secondary network device operates in an unlicensed band.

6. A method in a terminal device having Dual Connectivity, DC, with a master network device and a secondary network device, the method comprising:
detecting a Listen Before Talk, LBT, failure condition or a channel occupancy condition associated with a connection to the secondary network device, the detecting comprising:
determining a data amount threshold for a split bearer based on LBT statistics; and
determining an amount of the data, as stored in a buffer, is larger than or equal to the determined data amount threshold; and
transmitting uplink information associated with the secondary network device to the master network device in response to the LBT failure condition or the channel occupancy condition.

7. The method of claim 6, wherein the LBT failure condition comprises a number of LBT failures being larger than a predetermined number threshold within a time period, and the channel occupancy condition comprises a channel occupancy being higher than a predetermined occupancy threshold.

8. The method of claim 6, wherein the uplink information is transmitted over uplink resources reserved in the master network device.

9. The method of claim 6, further comprising, prior to transmitting the uplink information:
transmitting to the master network device a request for uplink resources; and
receiving from the master network device a message indicating allocated uplink resources, wherein the uplink information is transmitted over the allocated uplink resources.

10. The method of claim 6, wherein the uplink information comprises Uplink Control Information, UCI, or Physical Random Access Channel, PRACH, signaling.

11. The method of claim 6, wherein the master network device operates in a licensed or unlicensed band, and secondary network device operates in an unlicensed band.

12. A method in a network device communicative with a terminal device having Dual Connectivity, DC, with the network device and another network device, the method comprising:
receiving from the terminal device a Buffer Status Report, BSR, indicating a buffer status associated with a Medium Access Control, MAC, entity connected to the other network device, the BSR being received after:
determining a data amount threshold for a split bearer based on Listen Before Talk, LBT, statistics; and
a determination that an amount of the data, as stored in a buffer, is larger than or equal to the data amount threshold; and
forwarding the BSR to the other network device.

13. The method of claim 12, wherein the network device serves as a master network device and the other network device serves as a secondary network device.

14. A method in a network device communicative with a terminal device having Dual Connectivity, DC, with the network device, as a master network device, and a secondary network device, the method comprising:
determining, for a split bearer, a configuration for splitting data of an aggregated buffer size between the master network device and the secondary network device based at least on Listen Before Talk, LBT, statistics associated with respective connections from the terminal device to the master network device and the secondary network device, the determining comprising:
determining a data amount threshold based on the LBT statistics; and
determining to split the data when an amount of the data, as stored in a buffer, is larger than or equal to the determined data amount threshold; and
signaling the configuration to the terminal device.

15. The method of claim 14, wherein said determining is further based on data queuing delays and/or loads associated with the respective connections.

16. The method of claim 14, wherein the master network device operates in a licensed or unlicensed band, and the secondary network device operates in an unlicensed band.

17. A method in a network device communicative with a terminal device having Dual Connectivity, DC, with the network device, as a master network device, and a secondary network device, the method comprising:
receiving from the terminal device uplink information associated with the secondary network device, the uplink information being received after:
determining a data amount threshold for a split bearer based on Listen Before Talk, LBT, statistics; and
a determination that an amount of the data, as stored in a buffer, is larger than or equal to the data amount threshold; and
forwarding the uplink information to the secondary network device.

18. The method of claim 17, wherein the uplink information is received over uplink resources reserved in the master network device.

19. The method of claim 17, further comprising, prior to receiving the uplink information:
receiving from the terminal device a request for uplink resources; and
transmitting to the terminal device a message indicating allocated uplink resources,
wherein the uplink information is received over the allocated uplink resources.

20. The method of claim 17, wherein the uplink information comprises Uplink Control Information, UCI, or Physical Random Access Channel, PRACH, signaling.

21. The method of claim 17, wherein the master network device operates in a licensed or unlicensed band, and the secondary network device operates in an unlicensed band.

* * * * *